(12) United States Patent
Ravi et al.

(10) Patent No.: US 11,979,262 B1
(45) Date of Patent: May 7, 2024

(54) IDENTIFYING AND TRAINING FLOATING TAP FOR DECISION FEEDBACK EQUALIZATION

(71) Applicant: Cadence Design Systems, Inc., San Jose, CA (US)

(72) Inventors: Hari Anand Ravi, Bangalore (IN); Sachin Ramesh Gugwad, Bangalore (IN)

(73) Assignee: Cadence Design Systems, Inc., San Jose, CA (US)

(*) Notice: Subject to any disclaimer, the term of this patent is extended or adjusted under 35 U.S.C. 154(b) by 68 days.

(21) Appl. No.: 17/569,978

(22) Filed: Jan. 6, 2022

(51) Int. Cl.
H04L 25/03 (2006.01)

(52) U.S. Cl.
CPC .. H04L 25/03057 (2013.01); H04L 25/03267 (2013.01)

(58) Field of Classification Search
CPC ...... H04B 1/0007; H04B 1/0028; H04B 1/10; H04B 1/16; H04L 25/03006; H04L 25/03057; H04L 25/03267
USPC ......... 375/229, 231–233, 346, 348; 708/322, 708/323
See application file for complete search history.

(56) References Cited

U.S. PATENT DOCUMENTS

| | | | | |
|---|---|---|---|---|
| 9,215,104 | B1* | 12/2015 | Vita | H04L 25/03057 |
| 10,938,401 | B1* | 3/2021 | Olieman | H03M 1/462 |
| 2009/0016422 | A1* | 1/2009 | Zhong | H04L 25/03057 375/233 |
| 2011/0142120 | A1* | 6/2011 | Liu | H04L 25/03885 375/233 |
| 2013/0039407 | A1* | 2/2013 | Aziz | H04L 25/03057 375/233 |
| 2013/0230093 | A1* | 9/2013 | Aziz | H04L 25/03057 375/233 |
| 2015/0349988 | A1* | 12/2015 | Annampedu | H04L 25/03019 375/231 |
| 2020/0252247 | A1* | 8/2020 | Palusa | H04L 27/01 |

* cited by examiner

*Primary Examiner* — Young T. Tse
(74) *Attorney, Agent, or Firm* — Schwegman Lundberg & Woessner, P.A.

(57) ABSTRACT

Various embodiments provide for identifying and training a floating tap for decision feedback equalization. For some embodiments, the identification and training of the floating tap described herein can be part of a circuit for receiver block of a system, such as a memory system.

20 Claims, 15 Drawing Sheets

IDENTIFYING AND TRAINING FLOATING TAP FOR DECISION FEEDBACK EQUALIZATION

TECHNICAL FIELD

Embodiments described herein relate to circuits and, more particularly, to identifying and training a floating tap for decision feedback equalization.

BACKGROUND

Parallel data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments can lead to transmission errors. The quality of a channel can determine an upper limit on its achievable rate. Additionally, other impairments in a parallel data link can degrade overall system performance. For instance, circuit non-idealities can also cause a degradation in a system's performance. Overall, minimizing impairments can enable a channel to reach or achieve higher link rates.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
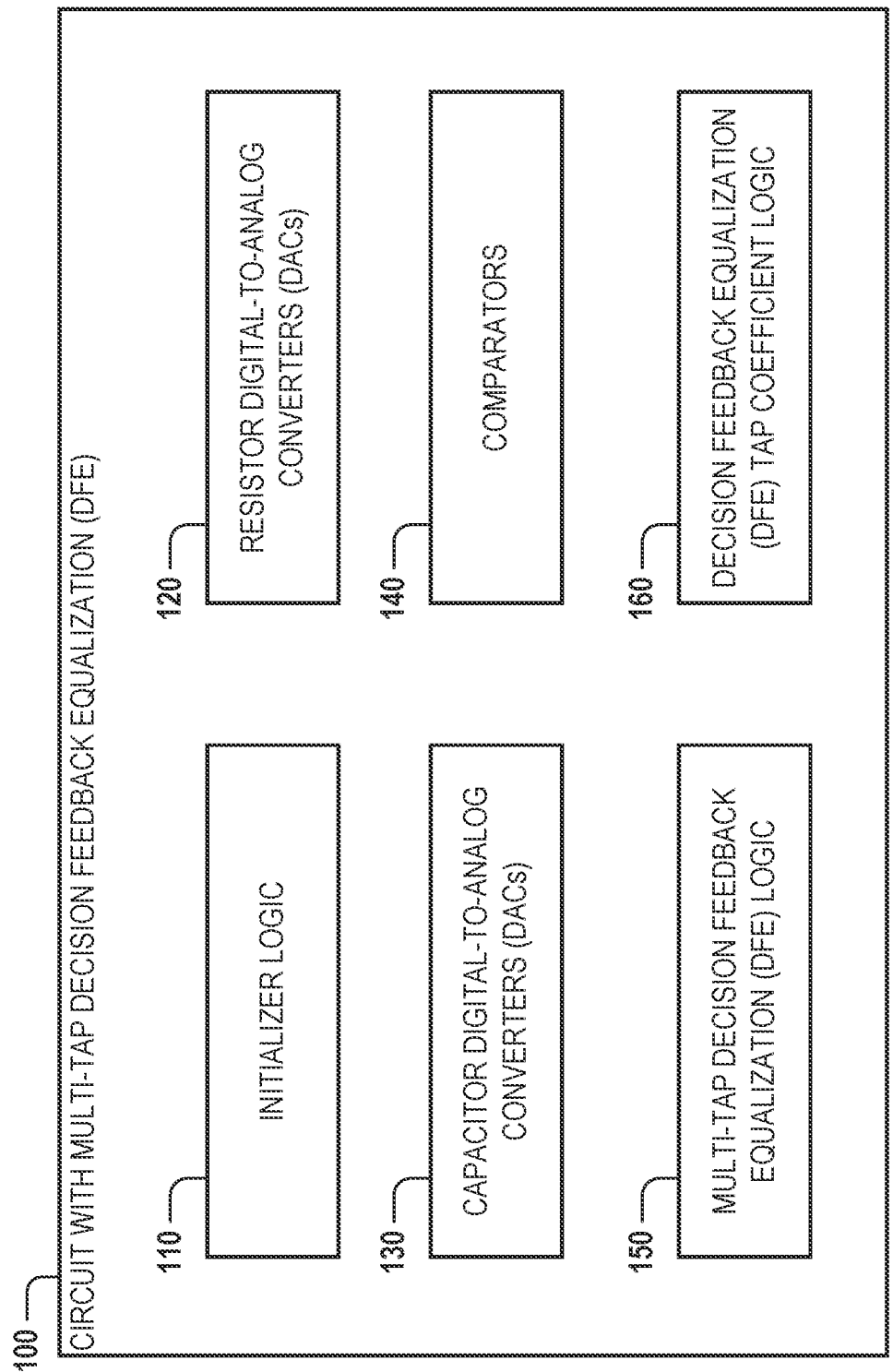
FIG. 1 is a block diagram of an example circuit that includes identification and training of a floating tap of a decision feedback equalization (DFE), in accordance with various embodiments.

Various embodiments provide for identifying and training a floating tap for decision feedback equalization. For some embodiments, the identification and training of the floating tap described herein can be part of a circuit for receiver block of a system, such as a memory system (e.g., Double Data Rate (DDR) memory system).

As data rates increase between a data transmitter and a data receiver, bit duration (also referred to as a unit interval or UI) gets smaller, and smaller UIs reduce allowed timing errors within a data receiver. Higher data rates also mean that overall, a data receiver has to perform operations faster. Conventional data receivers are known to use a DFE to compensate for inter-symbol interface (ISI) present within a received data signal (e.g., received from a data transmitter). For instance, DFE can be used in high-speed DDR memory system receivers to recover timing and voltage noise margins lost due to package and printed circuit board (PCB) transmission losses.

Typically, a DFE uses a data sampler to determine (e.g., make a decision on) a value of an incoming bit of a received data signal (e.g., thereby quantizing the received data signal) for a current bit duration (also referred to as a unit interval or UI), obtain a value of a preceding bit (e.g., value of bit from one UI before) via a first tap of the DFE, scale the value of the preceding bit by a coefficient (e.g., tap weight) associated with the first tap, and apply the scaled value to a next incoming bit of the received signal by adding the scaled value to, or subtracting the scaled value from, the received signal via an analog summer. Generally, where only DFE-based equalization is used at a data receiver, the one or more tap weights (associated with the different taps) of the DFE would equal the non-equalized channel pulse response values for the incoming data signal (e.g., [a1, a2, ... an]).

As data rates increase between a data transmitter and a data receiver, UI gets smaller and smaller UIs reduce allowed timing errors within a data receiver. For instance, in conventional data receivers that use a direct-feedback DFE, a first tap of the DFE is expected to settle within one UI (which can represent a one-bit period). However, with high data rates, closing the timing of a first tap of the DFE (with direct feedback) can be a challenge. As a result, conventional data receivers often use a DFE with tap loop unrolling. For example, the loop of the first tap of a one-tap DFE can be "unrolled" such that the feedback tap-weight component and analog summer are replaced with a multiplexer (MUX), and two different data samplers (with different threshold voltages) are used to pre-compute two possibilities for the incoming bit of the received data signal at a current UI. Depending on the implementation, more than one tap loop of a DFE can be unrolled, with the number of data samplers increasing exponentially based on the number of unrolled taps (e.g., 2N, where N represents the number tap loops unrolled).

Memory systems (e.g., multi-rank/channel memory systems) usually have parallel signals, use single-ended signaling, and have channel responses that are highly reflective. The DFE is usually a loop-unrolled DFE, as it is otherwise difficult to close timing for initial taps at high data rates (e.g., in a DDR memory system). However, the higher the number of unrolled taps used by a DFE, the higher the number of receivers and reference generators (as it is a single-ended system) that are needed, which increases power and area of the receiver circuit (e.g., IP block) of the memory system. Additionally, due to reflective nature of the channel response, there are situations where certain taps become more dominant than others.

Accordingly, DFEs used in data signal receivers of memory systems (and other systems) can benefit from an unrolled floating tap DFE that is low in circuit area, is power efficient, and has optimal signal level detection. While a conventional floating tap DFE can be used to provide these benefits, training for such conventional DFEs involves a user specifying which one of the taps are floating taps. For instance, the user would program the data signal receiver (e.g., of a physical layer (PHY) device) to specify that tap 1 and tap 4 of a four-tap DFE are the two floating taps, the user configures the DFE logic based on these floating tap choices, and the DFE is trained for these two taps. Additionally, dominant taps are not usually known ahead of time, and so it can take multiple iterations to find the dominant tap for a given channel of a data signal receiver.

Various embodiments described herein address these and other deficiencies present in conventional technologies. In particular, various embodiments provide for a multi-tap DFE where a subset of taps of the multi-tap DFE are automatically identified and used as floating taps, each of which can operate as an unrolled tap. According to some embodiments, the multi-tap DFE is configured such that one or more dominant taps (e.g., first and second dominant taps) are automatically identified from the multiple taps (e.g., four taps) of the DFE and used as floating taps. Accordingly, various embodiments provide for a method (e.g., training scheme) that determines (e.g., identifies) a plurality of coefficients of a multi-tap DFE, automatically determines (e.g., identifies) one or more of the most dominant taps (e.g., two most dominant taps out of the four taps) of the multi-tap DFE that are to be used as floating taps, redetermines coefficients for these one or more most dominant taps (e.g., the DFE training for these coefficients), and reconfigures logic of the DFE to apply the plurality of coefficients that results at the end of the method. The number of floating taps of an embodiment can be determined such that a balance is achieved between performance of the DFE and the power and area used by the DFE circuit (e.g., DFE circuit within a data signal receiver IP block). For instance, some embodiments provide for a four-tap DFE where any two taps out of the four taps of the DFE are automatically identified and used as floating taps.

For some embodiments, a resistor digital-to-analog converter (DAC) is used to generate an offset based on a reference voltage (VREF) (e.g., an analog voltage), which is used to implement a determined coefficient for the first most dominant tap identified. In doing so, the VREF-based offset can enable better voltage and temperature (VT) drift tracking of the DFE coefficient and can provide a large offset range. Additionally, for some embodiments, a capacitor digital-to-analog converter (DAC) is used to generate an offset based on a VREF, which is used to implement the determined coefficient for the second most dominant tap identified. While the capacitor DAC provides a smaller offset range and lower VT drift tracking performance compared to a resistor DAC, the capacitor DAC uses less power and area than a resistor DAC. Various embodiments described herein can form part of a data signal receiver (e.g., such as a channel receiver), which can form part of a physical layer (PHY) component (e.g., of a memory system).

During operation, an embodiment can use a VREF generated by a resistor ladder to determine (e.g., identify or train) coefficients for taps of a DFE (e.g., four taps) and use the determined coefficients to sort the taps according to their dominance (e.g., four taps sorted as tap A, tap B, tap C, and tap D, with tap A coefficient being the highest and tap D coefficient being the lowest). An eye scan approach (e.g., hardware-based approach) can be used to determine (e.g., identify or train) the coefficient for the taps of the DFE. A VREF-based offset generated by a resistor DAC can be used to implement the coefficient of tap A, and an offset generated by a capacitor DAC can be used to implement the coefficient of tap B. Per bit DFE coefficient can be determined for tap A and, subsequently, a coefficient can be determined for tap B (e.g., DFE is retrained to find the tap B coefficient in terms of the offset generated by the capacitor DAC). Eventually, logic for the DFE is configured such that each incoming bit is chosen based on tap A and tap B.

Some embodiments described herein can form part of a data signal receiver block of a transceiver or a physical (PHY) layer of a receiving device, such a data signal receiver of a memory system (e.g., DDR memory module). In a multi-channel system, a separate DFE described herein can be used for each different channel being received by a data signal receiver block or PHY layer (e.g., of a memory system).

As used herein, a floating tap of a DFE can comprise a tap that is selected from a plurality of taps of the DFE to operate as an unrolled tap. As used herein, training a tap of a DFE can comprise determining (e.g., identifying) a coefficient for the tap (e.g., using a training process).

Although various embodiments are illustrated and described with respect to a four-tap DFE with two floating taps, for some embodiments, this similar concept can be expanded to other multi-tap DFEs that have a different number of floating taps (e.g., six-tap DFE with three floating taps).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram of an example circuit 100 that includes identification and training of a floating tap of a DFE, in accordance with various embodiments. The circuit 100 can represent at least a portion of a larger circuit that implements identification and training of a floating tap of a DFE, such a larger circuit being a data signal receiver. The circuit 100 as shown comprises an initializer logic 110, a plurality of resistor DACs 120, a plurality of capacitor DACs 130, a plurality of comparators 140, multi-tap DFE logic 150, and DFE tap coefficient logic 160.

The initializer logic 110 initializes the circuit 100 for identification and training of a floating tap of the multi-tap DFE logic 150. According to some embodiments, the initializer logic 110 cause a reference voltage (VREF) (e.g., nominal reference voltage) generated by the plurality of resistor DACs 120 to be trained (e.g., calibrated). Once trained, a code (e.g., VREF code) corresponding to the VREF as trained can be stored in a register (VREFSEL register), which can control the plurality of resistor DACs 120. The initializer logic 110 can ensure that a read eye is open without DFE, which enable a reference bit stream used during DFE tap coefficient training to be correct and valid. For instance, in the context of a data signal receiver of a memory system, the initializer logic 110 can cause a strobe position to be trained for all bits of a memory channel, and this training can include per bit de-skew training, which can enable additional phase offset in strobe position for each bit of a memory channel. Eventually (e.g., after the strobe position is trained with respect to a bit), a DFE training enable bit can be set (e.g., RX_DFE_EN<1:0> is set to 01 for the bit) to indicate that the bit is ready for DFE tap coefficient training. For some embodiments, after the DFE training enable bit is set for all bits, DFE tap training coefficient can proceed.

For some embodiments, each individual resistor DAC of the plurality of resistor DACs 120 is configured to generate a separate adjusted reference voltage based on a reference voltage. For some embodiments, the reference voltage comprises the reference voltage initially trained by the initializer logic 110.

The plurality of capacitor DACs 130 are operatively coupled the plurality of resistor DACs 120. For instance, a first capacitor DAC and a second capacitor DAC of the plurality of capacitor DACs 130 can be operatively coupled to a first resistor DAC of the plurality of resistor DACs 120 and receive a first adjusted reference voltage generated by the first resistor DAC, while a third capacitor DAC and a fourth capacitor DAC of the plurality of capacitor DACs 130 can be operatively coupled to a second resistor DAC of the plurality of resistor DACs 120 and receive a second adjusted reference voltage generated by the second resistor DAC. For some embodiments, each individual capacitor DAC of the plurality of capacitor DACs 130 is configured to generate an individual threshold voltage based on an adjusted reference voltage provided by one of the plurality of resistor DACs 120. Additionally, for some embodiments, each individual capacitor DAC of the plurality of capacitor DACs 130 is operatively coupled to a corresponding comparator of the plurality of comparators 140 and provides its corresponding comparator with an individual threshold voltage.

The plurality of comparators 140 comprises individual comparators that each can operate as data signal receivers for the circuit 100 but with different voltage thresholds generated by way of the plurality of resistor DACs 120 and the plurality of capacitor DACs 130. For some embodiments, each individual comparator of the plurality of comparators 140 comprises a first input configured to receive a data signal, a second input to receive an individual threshold voltage from a corresponding capacitor DAC of the plurality of capacitor DACs 130, and a comparator output configured to provide an output signal generated based on the data signal and the individual threshold voltage. For instance, the plurality of comparators 140 can comprise a first, a second, a third, and a fourth comparator, where the second input of the first comparator is operatively coupled to the first capacitor DAC of the plurality of capacitor DACs 130, where the second input of the second comparator is operatively coupled to the second capacitor DAC of the plurality of capacitor DACs 130, where the second input of the third comparator is operatively coupled to the third capacitor DAC of the plurality of capacitor DACs 130, and where the second input of the fourth comparator is operatively coupled to the fourth capacitor DAC of the plurality of capacitor DACs 130. In this way, the plurality of capacitor DACs 130 can adjust the threshold voltage to, and operate as DFE controls for, the individual comparators of the plurality of comparators 140.

For some embodiments, the multi-tap DFE logic 150 is configured to implement multi-tap DFE with respect to the plurality of comparators 140 based on comparator outputs of the plurality of comparators 140. According to various embodiments, the multi-tap decision feedback equalization as implemented comprises a plurality of taps that includes a subset of floating taps. For instance, the multi-tap DFE logic 150 implements DFE with four taps, where one or two of the four taps (e.g., the two most dominant taps) can be selected to be used as floating taps.

For some embodiments, the DFE tap coefficient logic 160 is configured to determine (e.g., train) a plurality of coefficients corresponding to the plurality of taps of the DFE implemented by the multi-tap DFE logic 150. According to some embodiments, the DFE tap coefficient logic 160 implements a hardware-based eye scan approach to determining the plurality of coefficients, identifying one or more floating taps, and determining coefficients for the floating taps. The DFE tap coefficient logic 160 can then determine (e.g., identify) the subset of floating taps in the plurality of taps of the DFE. For instance, the DFE tap coefficient logic 160 can determine, based on the plurality of coefficients, a first dominant tap in the plurality of taps, which is used as one of the floating taps of the subset of floating taps. Additionally, the DFE tap coefficient logic 160 can determine, based on the plurality of coefficients, a second dominant tap in the plurality of taps, which is used as another one of the floating taps of the subset of floating taps. For some embodiments, DFE tap coefficient logic 160 can identify taps one, two, three, and four sequentially of a four-tap DFE using resistor ladder-based reference voltage offset provided by one of the plurality of resistor DACs 120 and sort the four taps in the order of their coefficient magnitude (e.g., as tap A, tap B, tap C, tap D, with tap A coefficient being the highest and tap D being the lowest). The DFE tap coefficient logic 160 can then redetermine a subset of coefficients, of the plurality of coefficients, that corresponds to the subset of floating taps. For example, the DFE tap coefficient logic 160 can determine (e.g., identify or train) a per bit coefficient for the first dominant tap and, subsequently, can determine (e.g., identify or train) a coefficient for the second dominant tap. When determining (e.g., identifying or training) the coefficient of a tap of the DFE, a predetermined data pattern, such as PRBS7 or higher, can be used and outputted as a reference bit stream by one of the plurality of comparators 140.

For some embodiments, the DFE tap coefficient logic 160 implements at least four different steps for a training process: as step one, finding an Nth tap using a reference voltage (VREF); as step two, finding per bit coefficient for a first dominant tap of the DFE and using one of the plurality of capacitor DACs 130; as step three, finding a coefficient for a second dominant tap of the DFE and using one of the plurality of capacitor DACs 130; and as a fourth step, configuring the circuit 100 (e.g., the plurality of resistor DACs 120, the plurality of capacitor DACs 130, and the multi-tap DFE logic 150) to apply the coefficients to the corresponding taps, where the per bit coefficient of the first dominant tap is implemented using at least one of the plurality of resistor DACs 120 and where the coefficient of the second dominant tap is implemented using at least one of the plurality of capacitor DACs 130. Different settings of the circuit 100 (e.g., enable bits RX_DFE_EN<1:0> and PHY_PER_BIT_DFE_EN) can determine which steps are performed and how the steps are performed. The following Table 1 illustrates an example of training flows by the DFE tap coefficient logic 160 to enable bits RX_DFE_EN<1:0> and PHY_PER_BIT_DFE_EN with respect to a four-tap DFE implemented by the multi-tap DFE logic 150.

TABLE 1

| RX_DFE_EN<1:0> | PHY_PER_BIT_DFE_EN | Training flow |
|---|---|---|
| 2'b 00 | 1'bX | Run Step 4 for all bits |
| 2'b 01 | 1'b0 | Run Step 1 for $K^{th}$ bit |
|  |  | Run Step 4 for all bits |
| 2'b 01 | 1'b1 | Run Step 1 for $K^{th}$ bit |
|  |  | Run Step 2 for all bits |
|  |  | Run Step 4 for all bits |
| 2'b 10 | 1'b0 | Run Step 1 for $K^{th}$ bit |
|  |  | Run Step 3 for $K^{th}$ bit |
|  |  | Run Step 4 for all bits |
| 2b' 10 | 1'b1 | Run Step 1 for $K^{th}$ bit |
|  |  | Run Step 3 for all bits |
|  |  | Run Step 4 for all bits |

Figure 2:
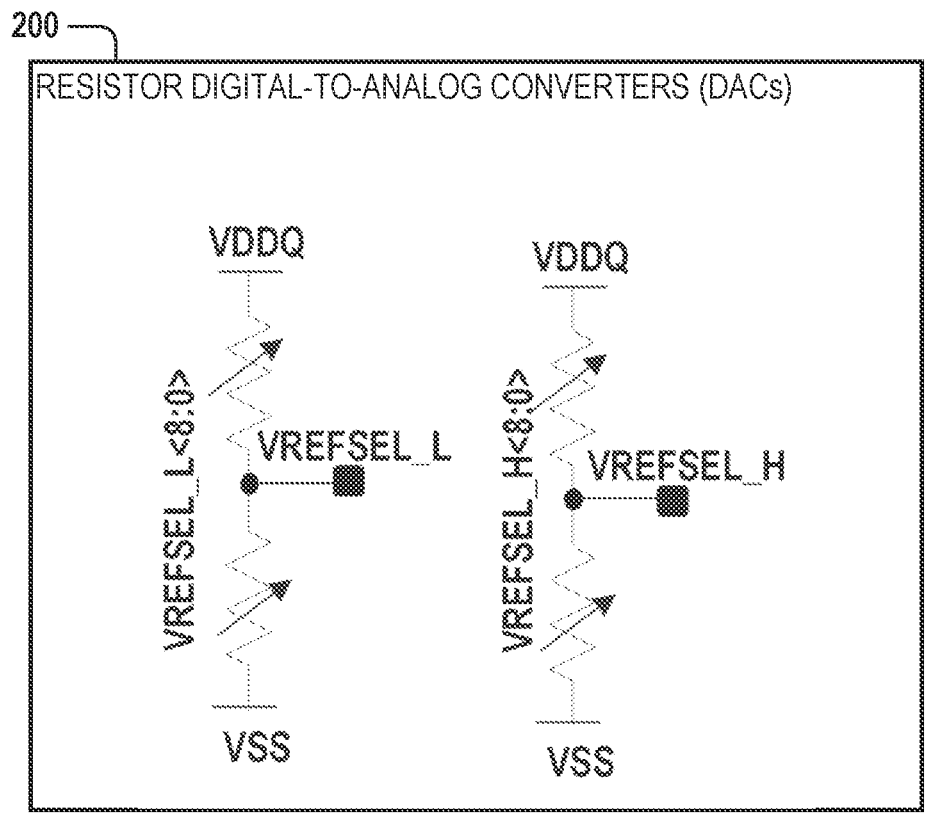
FIGS. 2 through 7 are diagrams illustrating example components of a circuit that includes identification and training of a floating tap of a DFE, in accordance with various embodiments.
Figure 3:
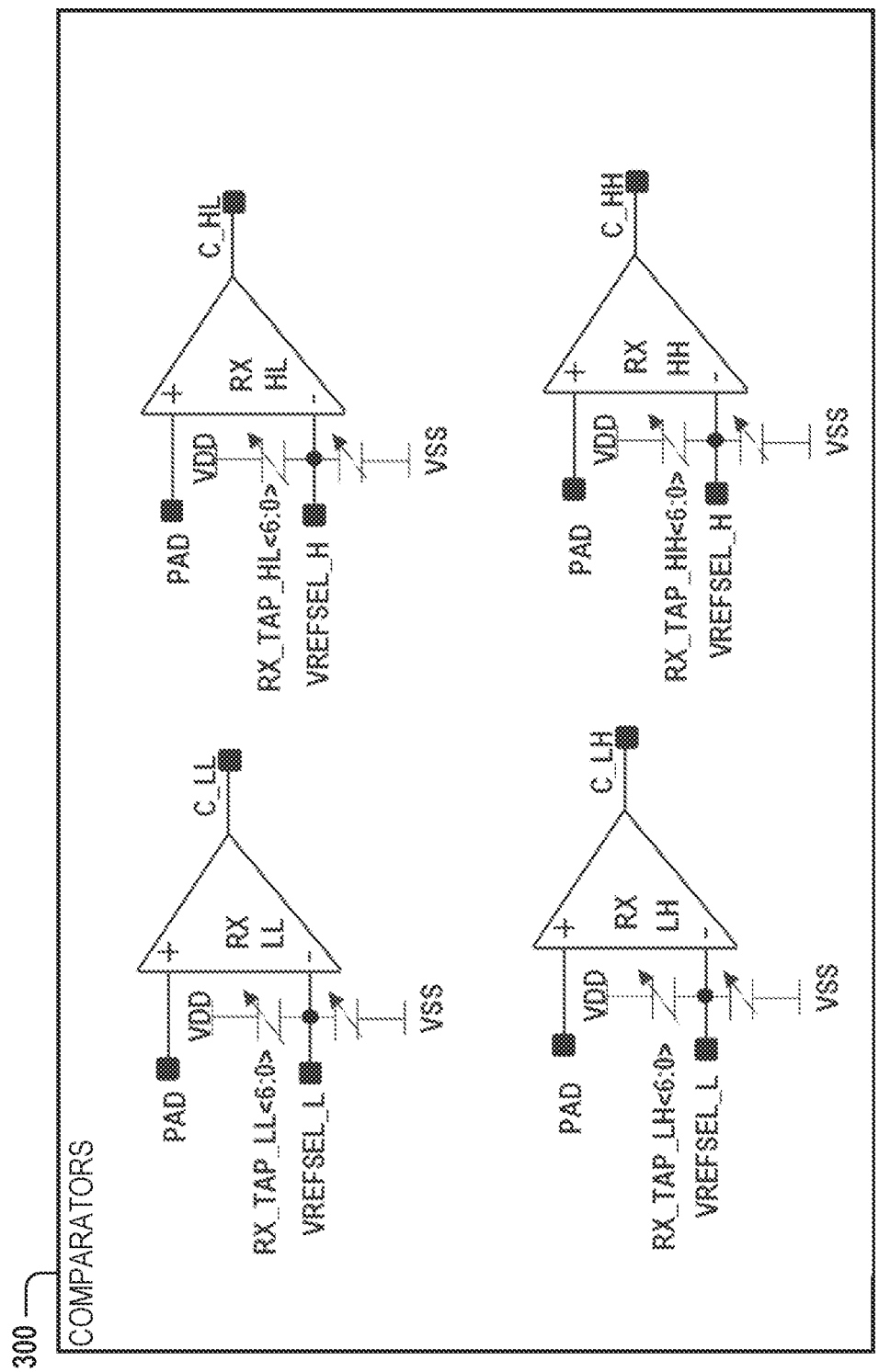
Figure 4:
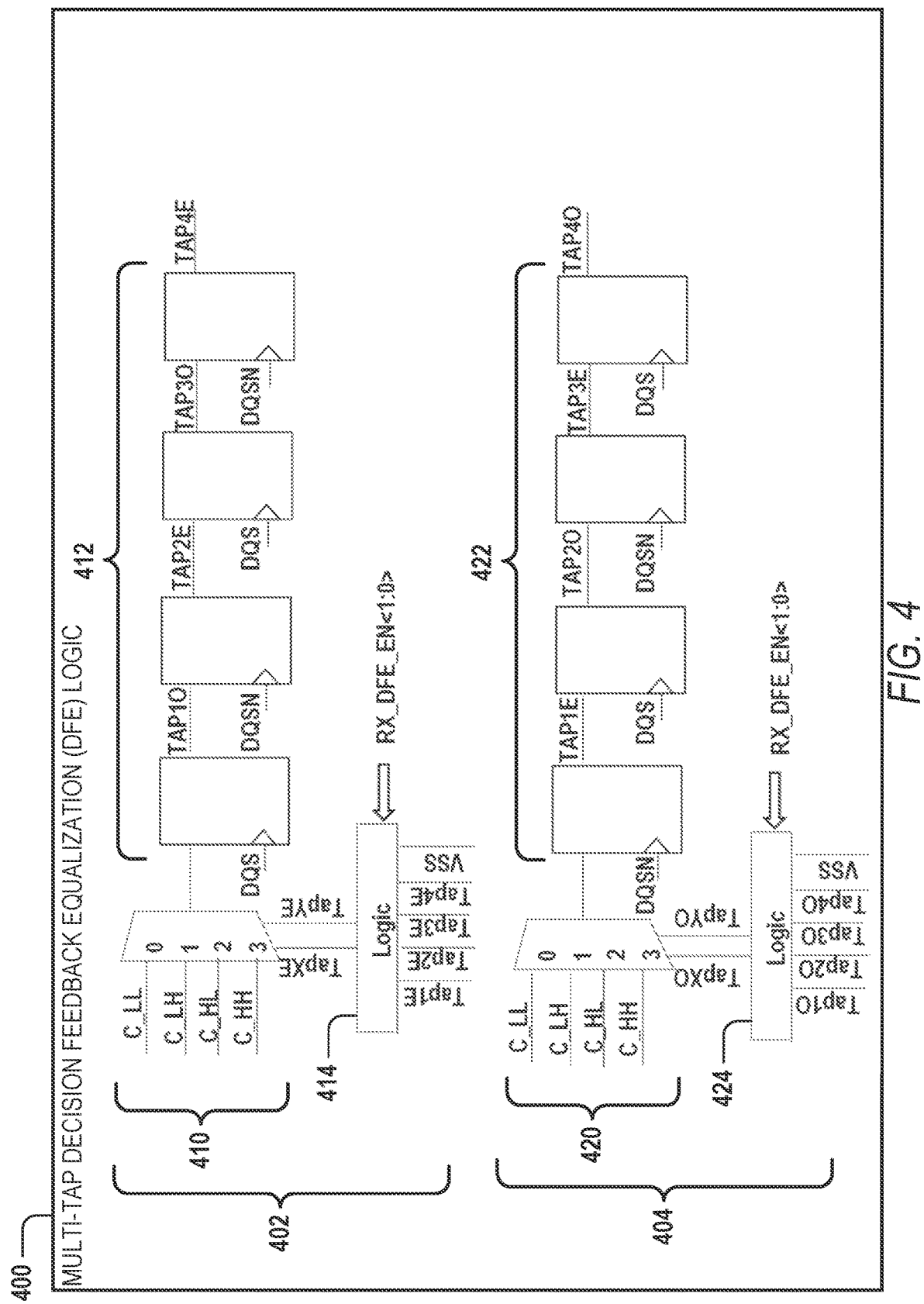
Figure 5:
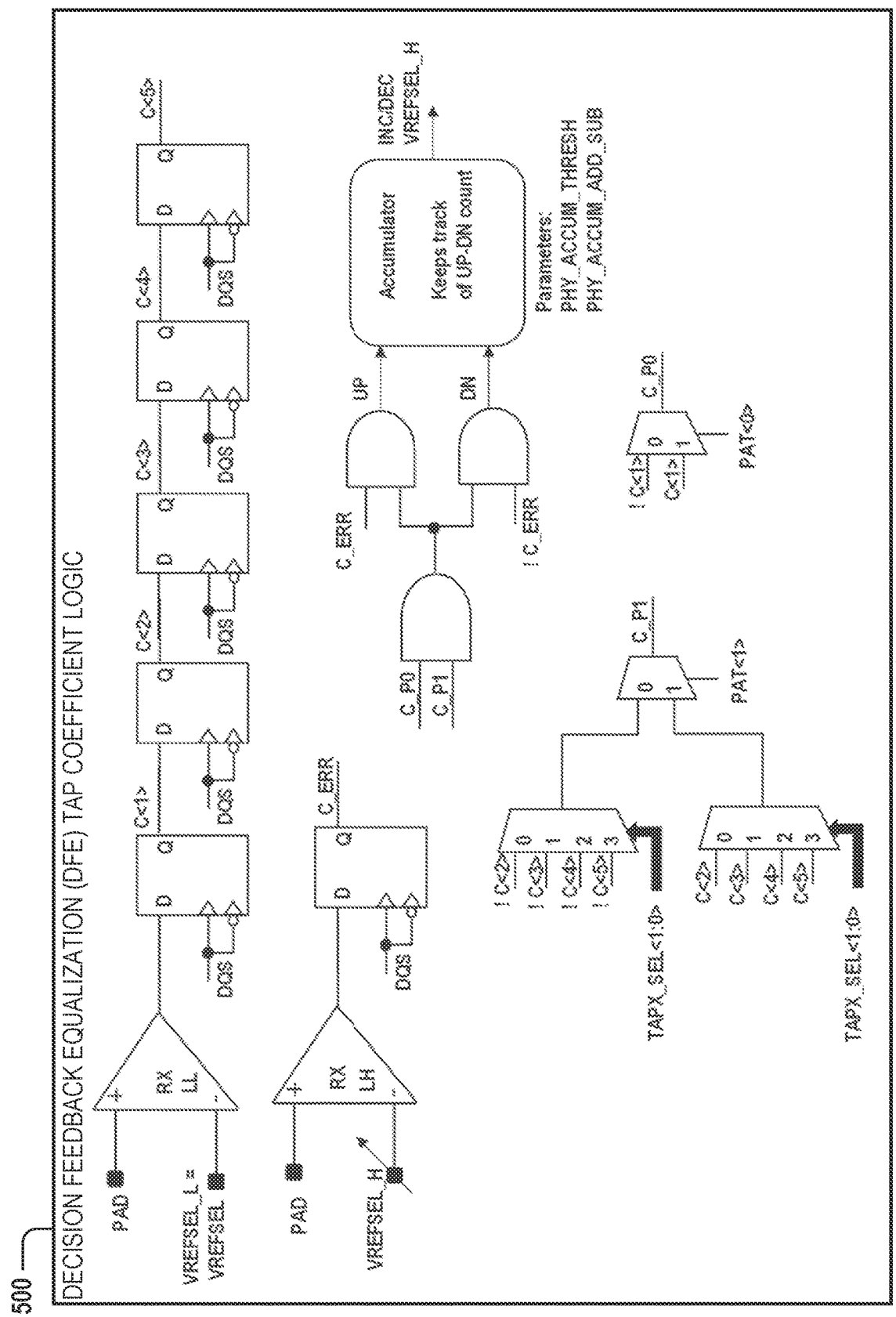
Figure 6:
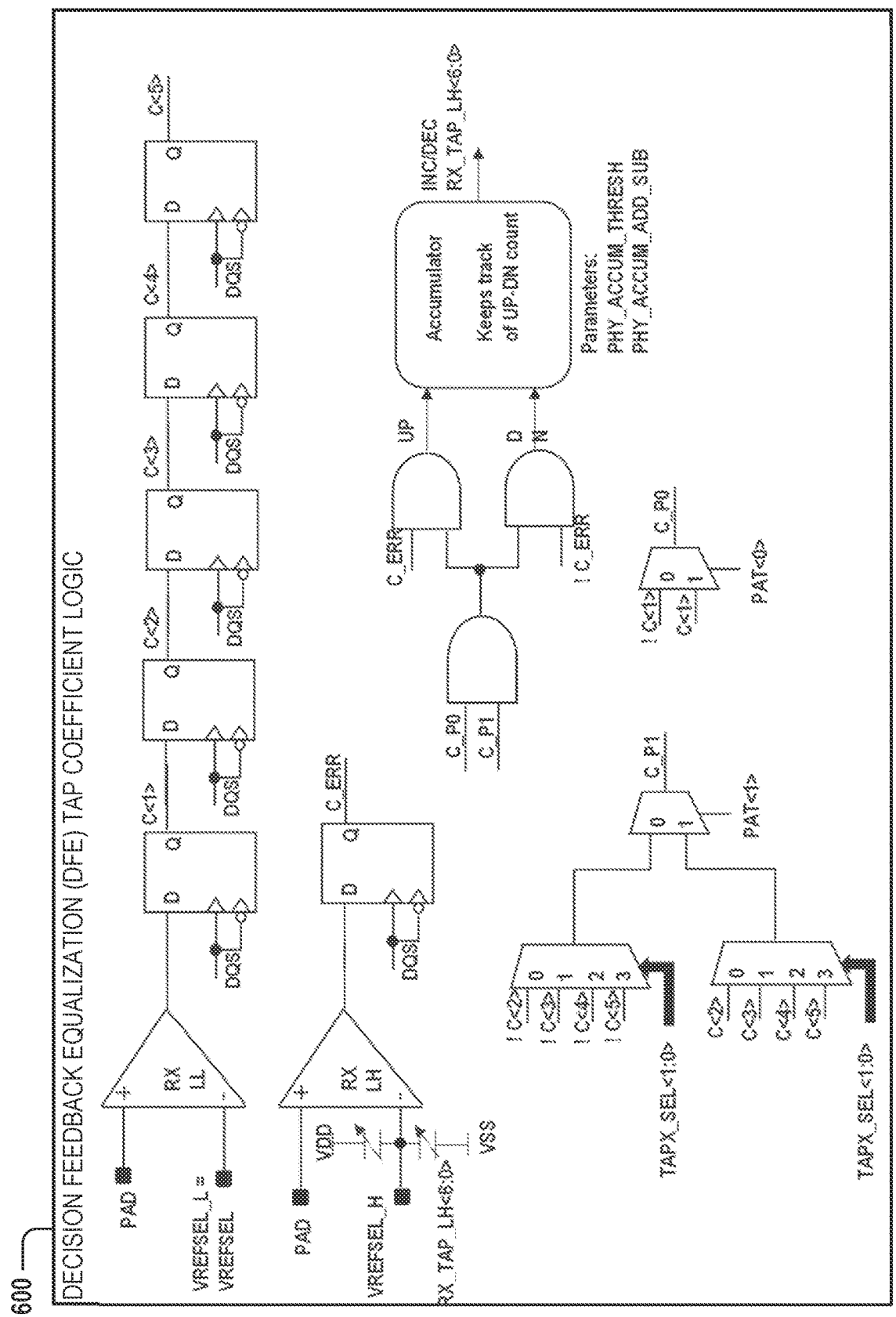
Figure 7:
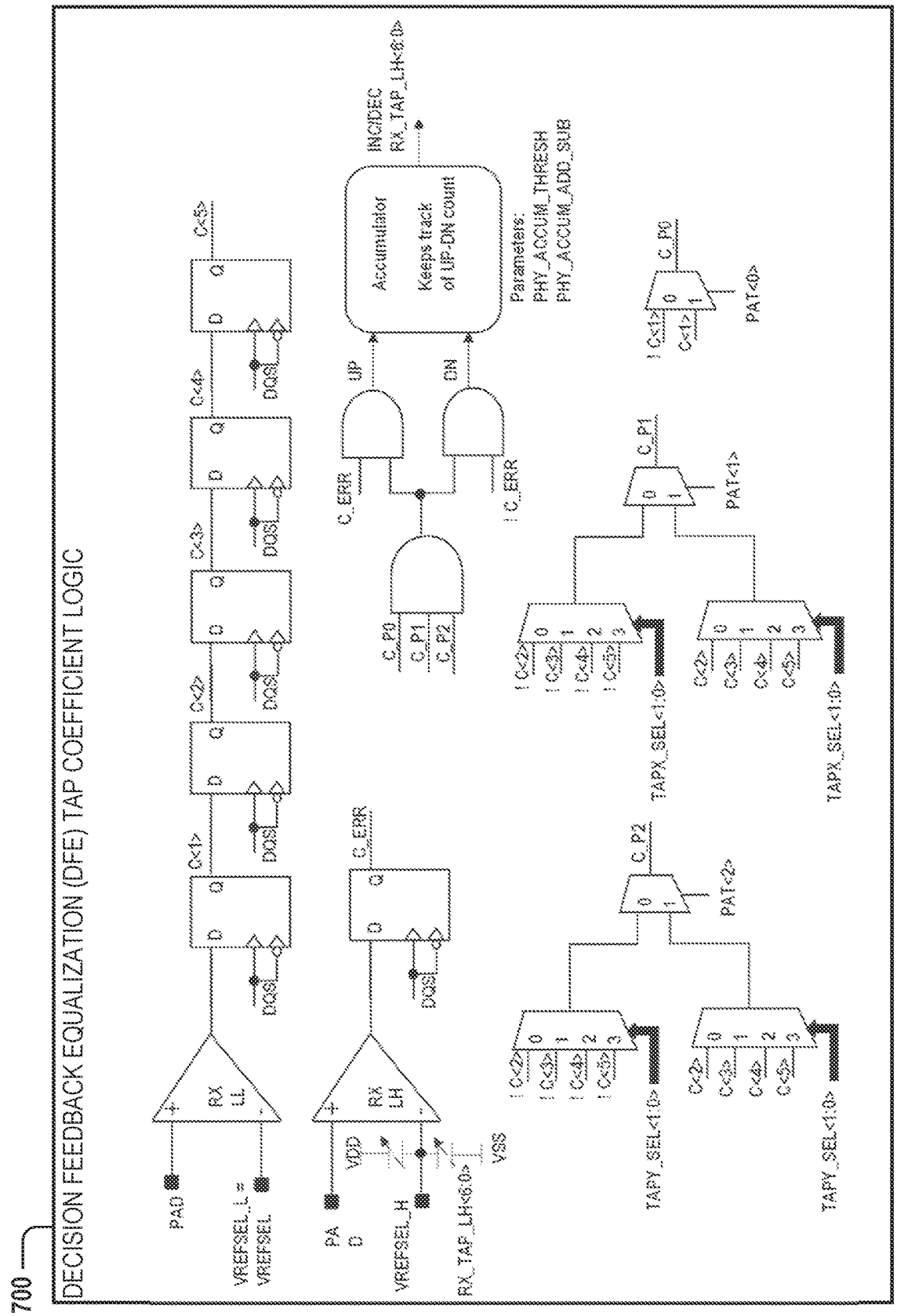

FIGS. 2 through 7 are diagrams illustrating example components of a circuit that includes identification and training of a floating tap of a DFE, in accordance with various embodiments. In particular, FIG. 2 illustrates an example plurality of resistor DACs 200. FIG. 3 illustrates an example plurality of comparators 300 that includes an example plurality of capacitor DACs. FIG. 4 illustrates an example multi-tap DFE logic 400. FIG. 5 illustrates a representation of an example DFE tap coefficient logic 500 when finding a coefficient for an Nth tap of a multi-tap DFE (e.g., step one of training process). FIG. 6 illustrates a representation of an example DFE tap coefficient logic 600 when finding a per bit coefficient for a first dominant tap of a multi-tap DFE (e.g., step two of training process). FIG. 7 illustrates a representation of an example DFE tap coefficient logic 700 when finding a coefficient for a second dominant tap of a multi-tap DFE (e.g., step three of training process). For some embodiments, the representations of one or more of FIGS. 5 through 7 are implemented by the same DFE tap coefficient logic (e.g., 160 of FIG. 1).

The following Table 2 lists relevant parameters for FIGS. 2 through 7.

TABLE 2

| Parameter | Description |
| --- | --- |
| VDDQ | I/O supply voltage. |
| VDD | Core supply voltage. |
| VSS | I/O and core supply ground. |
| VREFSEL_H<8:0> | Control resistor DAC that generates analog voltage. VREFSEL_H as an adjusted reference voltage. This voltage level of the analog voltage VREFSEL_H can be anywhere between VSS and VDDQ. |
| VREFSEL_L<8:0> | Control resistor DAC that generates analog voltage. VREFSEL_L as an adjusted reference voltage. This voltage level of the analog voltage VREFSEL_L can be anywhere between VSS and VDDQ. |
| RX_TAP_LL<6:0> | Creates voltage offset to implement DFE for LL receiver (e.g., +/−50 mV offset). |
| RX_TAP_LH<6:0> | Creates voltage offset to implement DFE for LH receiver (e.g., +/−50 mV offset). |
| RX_TAP_HL<6:0> | Creates voltage offset to implement DFE for HL receiver (e.g., +/−50 mV offset). |
| RX_TAP_HH<6:0> | Creates voltage offset to implement DFE for HH receiver (e.g., +/−50 mV offset). |
| RX_DFE_EN<1:0> | 2'b 00 : DFE disabled. Only C_LL receiver is enabled<br>2'b 01 : 1 floating Tap DFE. C_LL and C_LH receivers are enabled<br>2'b 10 : 2 floating Tap DFE. C_LL, C_LH, C_HL, C_HH receivers are enabled<br>2'b 11 : Not used |
| PHY_PER_BIT_DFE_EN | 1'b0 Per bit DFE disabled<br>1'b1 Per bit DFE enabled. |
| PHY_ACCUM_THRESH | 16'b register : Once the accumulator hits a min or max value (e.g., Min value is −d'32,767. Max value is +d'32,767), VREFSEL_H/RX_TAP_LH is either incremented or decremented. After VREFSEL_H/RX_TAP_LH code update is performed, PHY_ACCUM_THRESHOLD is reset by the value specified in PHY_ACCUM_ADD_SUB. |

TABLE 2-continued

| Parameter | Description |
| --- | --- |
| PHY_ACCUM_ADD_SUB | 16'b register (e.g., Min value is −d'32,767. Max value is +d'32,767) |

Referring now to FIG. 2, the plurality of resistor DACs 200 comprises a first resistor DAC that generates a first adjusted reference voltage VREFSEL_L based on an I/O supply voltage VDDQ, which is being used as a reference voltage, and a second resistor DAC that generates a second adjusted reference voltage VREFSEL_H based the I/O supply voltage VDDQ. Parameter VREFSEL_L<8:0> controls the first resistor DAC, and parameter VREFSEL_H<8:0> controls the second resistor DAC. An example voltage transfer characteristic of a resistor DAC of the plurality of resistor DACs 200 is represented by graph 800 of FIG. 8, with an example voltage step size of VDDQ/511.

Referring now to FIG. 3, the plurality of comparators 300 comprises four comparators that serve as data signal receivers with four different threshold voltages implemented by the plurality of capacitors DACs (e.g., 130). An example voltage transfer characteristic of a capacitor DAC of the plurality of capacitor DACs is represented by graph 802 of FIG. 8, with an example voltage offset corresponding to a value of d'127 for a parameter RX_TAP_*<6:0>.

The first comparator RX_LL comprises a first input PAD to receive a data signal and a second input operatively coupled to a first capacitor DAC, which generates a first threshold voltage based on a first adjusted reference voltage VREFSEL_L (from the first resistor DAC) and core voltage VDD, and where the first capacitor DAC is controlled by parameter RX_TAP_LL<6:0>. The first comparator RX_LL comprises a comparator output that provides a voltage C_LL generated by the first comparator RX_LL based on the data signal and the first threshold voltage.

The second comparator RX_LH comprises a first input PAD to receive a (same) data signal and a second input operatively coupled to a second capacitor DAC, which generates a second threshold voltage based on the first adjusted reference voltage VREFSEL_L (from the first resistor DAC) and core voltage VDD, and where the second capacitor DAC is controlled by parameter RX_TAP_LH<6:0>. The second comparator RX_LH comprises a comparator output that provides a voltage C_LH generated by the second comparator RX_LH based on the data signal and the second threshold voltage.

The third comparator RX_HL comprises a first input PAD to receive a (same) data signal and a second input operatively coupled to a third capacitor DAC, which generates a third threshold voltage based on a second adjusted reference voltage VREFSEL_H (from the second resistor DAC) and core voltage VDD, and where the third capacitor DAC is controlled by parameter RX_TAP_HL<6:0>. The third comparator RX_HL comprises a comparator output that provides a voltage C_HL generated by the third comparator RX_HL based on the data signal and the third threshold voltage.

The fourth comparator RX_HH comprises a first input PAD to receive a (same) data signal and a second input operatively coupled to a fourth capacitor DAC, which generates a fourth threshold voltage based on the second adjusted reference voltage VREFSEL_H (from the second resistor DAC) and core voltage VDD, and where the fourth capacitor DAC is controlled by parameter RX_TAP_HH<6:0>. The fourth comparator RX_HH comprises a comparator output that provides a voltage C_HH generated by the fourth comparator RX_HH based on the data signal and the fourth threshold voltage.

Where an embodiment is enabled to use one floating tap, less than all of the comparators of the plurality of comparators 300 are enabled for use. For instance, to implement use of one floating tap, only comparators RX_LL and RX_LH can be enabled, while the RX_HL and RX_HH are disabled.

Referring now to FIG. 4, the multi-tap DFE logic 400 implements a four-tap DFE where two of the four taps are floating. As shown, the multi-tap DFE logic 400 comprises a first portion 402 that generates tap values TAP1O, TAP2E, TAP3O, and TAP4E, and a second portion 404 that generates tap values TAP1E, TAP2O, TAP3E, and TAP4O. With respect to the first portion 402, a multiplexer 410 receives outputs (C_LL, C_LH, C_HL, C_HH) from the four comparators of the plurality of comparators 300 of FIG. 3, and based on control signals TapXE and TapYE from a control logic 414, selectively outputs to a chain of flip-flops 412, which output the tap values TAP1O, TAP2E, TAP3O, and TAP4E. The control logic 414 receives the tap values TAP1E, TAP2E, TAP3E, TAP4E, and core supply voltage VSS, and generates the control signals TapXE and TapYE based on those inputs and parameter RX_DFE_EN<1:0>. With respect to the second portion 404, a multiplexer 420 receives outputs (C_LL, C_LH, C_HL, C_HH) from the four comparators of the plurality of comparators 300 of FIG. 3, and based on control signals TapXO and TapYO from a control logic 424, selectively outputs to a chain of flip-flops 422, which output the tap values TAP1E, TAP2O, TAP3E, and TAP4O. The control logic 424 receives the tap values TAP1O, TAP2O, TAP3O, TAP4O, and core supply voltage VSS, and generates the control signals TapXO and TapYO based on those inputs and parameter RX_DFE_EN<1:0>. As described with respect to Table 1, parameter RX_DFE_EN<1:0> can control the operation of the multi-tap DFE logic 400 through the control logic 414 and the control logic 424. For instance, through parameter RX_DFE_EN<1:0>, the multi-tap DFE logic 400 can disable DFE, enable DFE with one floating tap, or enable DFE with two floating taps.

Referring now to FIG. 5, the DFE tap coefficient logic 500 as shown is used to find (e.g., identify) a coefficient for an Nth tap of a multi-tap DFE (e.g., implemented by multi-tap DFE logic 150 of FIG. 1). A receiver RX_LL can comprise the first comparator RX_LL of FIG. 3, and a receiver RX_LH can comprise the second comparator RX_LH of FIG. 3. To find a coefficient for a first tap (e.g., parameter TAPX_SEL<1:0> set to b'00) of the multi-tap DFE (hereafter, referred to as step 1A), the following operation can be performed while the parameter TAPX_SEL<1:0> is set to b'00. The RX_LL receiver can be used to generate reference bit stream, where the threshold voltage VREFSEL_L of the RX_LL receiver is fixed to a nominal reference voltage VREFSEL. The RX_LH receiver can be used to find the coefficient for the first tap and, as such, is used for training. Initially threshold voltage VREFSEL_H of the RX_LH receiver is set to the nominal reference voltage VREFSEL. The control codes (parameter RX_TAP_*<6:0>) for the capacitor DACs can be set to d'64 for both the RX_LL and RX_LH receivers. Parameter PAT<1:0> can be set to b'00 to find an average level for a first data pattern associated with b'00. An incoming reference bit stream can be scanned by the RX_LL receiver, and a decision to increase or decrease the threshold voltage VREFSEL_H can be rendered. For instance, if the parameter PAT<1:0> is set to b'00 and C_ERR is equal to 1, an UP count tracked by an accumulator can be increased, and if the parameter PAT<1:0> is set to b'00 and C_ERR is equal to 0, a DN (down) count tracked by the accumulator can be increased. In this way, the threshold voltage VREFSEL_H can eventually converge to an average level of b'00 for the first tap, and this value for the threshold voltage VREFSEL_H can be stored in a first register for the first tap (e.g., register VREFSEL_W1_00 associated with the first tap) as the coefficient for the first tap based on the first data pattern.

For the remainder of step 1A, the forgoing steps (for the first data pattern associated with b'00) can be repeated for the first tap while the PAT<1:0> is set to b'01 to find an average level for a second data pattern associated with b'01, and this value for the threshold voltage VREFSEL_H can be stored in a second register for the first tap (e.g., register VREFSEL_W1_01 associated with the first tap) as the coefficient for the first tap based on the second data pattern. The forgoing steps (for the first data pattern associated with b'00) can be repeated for the first tap when the PAT<1:0> is set to b'10 to find an average level for a third data pattern associated with b'10, and this value for the threshold voltage VREFSEL_H can be stored in a third register for the first tap (e.g., register VREFSEL_W1_10 associated with the first tap) as the coefficient for the first tap based on the third data pattern. Additionally, the forgoing steps (for the first data pattern associated with b'00) can be repeated for the first tap while the PAT<1:0> is set to b'11 to find an average level for a fourth data pattern associated with b'11, and this value for the threshold voltage VREFSEL_H can be stored in a fourth register for the first tap (e.g., register VREFSEL_W1_11 associated with the first tap) as the coefficient for the first tap based on the fourth data pattern. Based on the four registers for the first tap (e.g., VREFSEL_W1_00, VREFSEL_W1_01, VREFSEL_W1_10, VREFSEL_W1_11), a coefficient (e.g., VREFSEL_1) for the first tap can be computed, as illustrated in Table 4.

To find a coefficient for a second tap (e.g., parameter TAPX_SEL<1:0> set to b'01) of the multi-tap DFE (hereafter, referred to as step 1B), step 1A can be repeated with respect to the second tap of the multi-tap DFE while the parameter TAPX_SEL<1:0> is set to b'01. Based on the four registers for the second tap (e.g., VREFSEL_W2_00, VREFSEL_W2_01, VREFSEL_W2_10, VREFSEL_W2_11), a coefficient (e.g., VREFSEL_2) for the second tap can be computed, as illustrated in Table 4. To find a coefficient for a third tap (e.g., parameter TAPX_SEL<1:0> set to b'10) of the multi-tap DFE (hereafter, referred to as step 1C), step 1A can be repeated with respect to the third tap of the multi-tap DFE while the parameter TAPX_SEL<1:0> set to b'10. Based on the four registers for the third tap (e.g., VREFSEL_W3_00, VREFSEL_W3_01, VREFSEL_W3_10, VREFSEL_W3_11), a coefficient (e.g., VREFSEL_3) for the third tap can be computed, as illustrated in Table 4. To find a coefficient for a fourth tap (e.g., parameter TAPX_SEL<1:0> set to b'11) of the multi-tap DFE (hereafter, referred to as step 1D), step 1A can be repeated with respect to the fourth tap of the multi-tap DFE while the parameter TAPX_SEL<1:0> set to b'11. Based on the four registers for the fourth tap (e.g., VREFSEL_W4_00, VREFSEL_W4_01, VREFSEL_W4_10, VREFSEL_W4_11), a coefficient (e.g., VREFSEL_4) for the fourth tap can be computed, as illustrated in Table 4.

After the coefficients are found for the first, second, third, and fourth taps (e.g., VREFSEL_1, VREFSEL_2, VREFSEL_3, VREFSEL_4 respectively), the first and second most dominant taps of the multi-tap DFE can be found. In particular, at step 1E, an absolute value of each coefficient can be determined (e.g., TAP_W1=ABS(VREFSEL_1); TAP_W2=ABS(VREFSEL_2); TAP_W3=ABS(VREFSEL_3); TAP_W4=ABS(VREFSEL_4)). At step 1F, the tap associated with the first highest value of the absolute values (e.g., TAP_W1, TAP_W2, TAP_W3, TAP_W4) can be identified as the first dominant tap (e.g., tap A) and, at step 1G, the tap associated with the second highest value of the absolute values (e.g., TAP_W1, TAP_W2, TAP_W3, TAP_W4) can be identified as the second dominant tap (e.g., tap B). Where two or more taps have the same magnitude, the earlier tap can be given preference as the dominant tap (e.g., if TAP_W2=TAP_W3, TAP_W2 can be given preference as the dominant tap of the two taps). Thereafter, parameter TAPX_SEL<1:0> can be used to identify the first dominant tap from the first, second, third, and fourth taps, and parameter TAPY_SEL<1:0> can be used to identify the second dominant tap from the first, second, third, and fourth taps. For instance, at step 1F, TAPX_SEL<1:0> can be set to 2'b00 if TAP_W1 is the highest value, TAPX_SEL <1:0> can be set to 2'b01 if TAP_W2 is the highest value, TAPX_SEL <1:0> can be set to 2'b10 if TAP_W3 is the highest value, and TAPX_SEL <1:0> can be set to 2'b11 if TAP_W4 is the highest value. At step 1G, TAPY_SEL <1:0> can be set to 2'b00 if TAP_W1 is the second highest value, TAPY_SEL <1:0> can be set to 2'b01 if TAP_W2 is the second highest value, TAPY_SEL <1:0> can be set to 2'b10 if TAP_W3 is the second highest value, and TAPY_SEL <1:0> can be set to 2'b11 if TAP_W4 is the second highest value. Once set with identification of the first dominant tap, the parameter TAPX_SEL<1:0> can be used to find a per bit coefficient for the first dominant tap (e.g., by the DFE tap coefficient logic 600 of FIG. 6).

Once set with identification of the second dominant tap, the parameter TAPY_SEL<1:0> can be used to find (e.g., redetermine) a coefficient for the second dominant tap (e.g., by the DFE tap coefficient logic 700 of FIG. 7).

The following Table 3 illustrates example parameters used when finding a coefficient for the first, second, third, and fourth taps of the multi-tap DFE during steps 1A, 1B, 1C, and 1D.

TABLE 3

| TAPX_SEL<1:0> | PAT<1:0>= b'00 | PAT<1:0>= b'01 | PAT<1:0>= b'10 | PAT<1:0>= b'11 |
|---|---|---|---|---|
| b'00 (first tap) | 5'b XXX00 | 5'b XXX01 | 5'b XXX10 | 5'b XXX11 |
| b'01 (second tap) | 5'b XX0X0 | 5'b XX0X1 | 5'b XX1X0 | 5'b XX1X1 |
| b'10 (third tap) | 5'b X0XX0 | 5'b X0XX1 | 5'b X1XX0 | 5'b X1XX1 |
| b'11 (fourth tap) | 5'b 0XXX0 | 5'b 0XXX1 | 5'b 1XXX0 | 5'b 1XXX1 |

The following Table 4 illustrates example parameters, registers, and computation formulas used to find the final coefficients for the first, second, third, and fourth taps of the multi-tap DFE during steps 1A, 1B, 1C, and 1D.

TABLE 4

| Step | TAPX_SEL <1:0> | PAT<1:0> | Registers Storing Results Obtained | Computation Formula to Find Tap Coefficient Based on Results from Register |
|---|---|---|---|---|
| Step 1A (to find 1$^{st}$ tap) | 2'b 00 | 2'b 00 | VREFSEL_W1_00 | VREFSEL_H1 = |
| | | 2'b 01 | VREFSEL_W1_01 | 0.5*(VREFSEL_W1_10 + |
| | | 2'b 10 | VREFSEL_W1_10 | VREFSEL_W1_11) |
| | | 2'b 11 | VREFSEL_W1_11 | VREFSEL_L1 = |
| | | | | 0.5*(VREFSEL_W1_00 + |
| | | | | VREFSEL_W1_01) |
| | | | | VREFSEL_1 = |
| | | | | 0.5*(VREFSEL_H1 − |
| | | | | VREFSEL_L1) |
| Step 1B (to find 2$^{nd}$ tap) | 2'b 01 | 2'b 00 | VREFSEL_W2_00 | VREFSEL_H2 = |
| | | 2'b 01 | VREFSEL_W2_01 | 0.5*(VREFSEL_W2_10 + |
| | | 2'b 10 | VREFSEL_W2_10 | VREFSEL_W2_11) |
| | | 2'b 11 | VREFSEL_W2_11 | VREFSEL_L2 = |
| | | | | 0.5*(VREFSEL_W2_00 + |
| | | | | VREFSEL_W2_01) |
| | | | | VREFSEL_2 = |
| | | | | 0.5*(VREFSEL_H2 − |
| | | | | VREFSEL_L2) |
| Step 1C (to find 3$^{rd}$ tap) | 2'b 10 | 2'b 00 | VREFSEL_W3_00 | VREFSEL_H3 = |
| | | 2'b 01 | VREFSEL_W3_01 | 0.5*(VREFSEL_W3_10 + |
| | | 2'b 10 | VREFSEL_W3_10 | VREFSEL_W3_11) |
| | | 2'b 11 | VREFSEL_W3_11 | VREFSEL_L3 = |
| | | | | 0.5*(VREFSEL_W3_00 + |
| | | | | VREFSEL_W3_01) |
| | | | | VREFSEL_3 = |
| | | | | 0.5*(VREFSEL_H3 − |
| | | | | VREFSEL_L3) |
| Step 1D (to find 4$^{th}$ tap) | 2b '11 | 2'b 00 | VREFSEL_W4_00 | VREFSEL_H4 = |
| | | 2'b 01 | VREFSEL_W4_01 | 0.5*(VREFSEL_W4_10 + |
| | | 2'b 10 | VREFSEL_W4_10 | VREFSEL_W4_11) |
| | | 2'b 11 | VREFSEL_W4_11 | VREFSEL_L4 = |
| | | | | 0.5*(VREFSEL_W4_00 + |
| | | | | VREFSEL_W4_01) |
| | | | | VREFSEL_4 = |
| | | | | 0.5*(VREFSEL_H4 − |
| | | | | VREFSEL_L4) |

Referring now to FIG. 6, the DFE tap coefficient logic 600 as shown is used to find (e.g., identify) a per bit coefficient for a first dominant tap of a multi-tap DFE (e.g., implemented by the multi-tap DFE logic 150 of FIG. 1). For instance, the DFE tap coefficient logic 600 can be used to find the per bit coefficient for the first dominant tap found (e.g., identified by parameter TAPX_SEL <1.0>) by the DFE tap coefficient logic 500 of FIG. 5.

A receiver RX_LL can comprise the first comparator RX_LL of FIG. 3, and a receiver RX_LH can comprise the second comparator RX_LH of FIG. 3. To find a per bit coefficient for a first dominant tap of the multi-tap DFE using a first data pattern (hereafter, referred to as step 2A), the following operation can be performed while the parameter TAPX_SEL<1:0> set to the first dominant tap (e.g., set by the DFE tap coefficient logic 500 of FIG. 5). The RX_LL receiver can be used to generate reference bit stream, where the threshold voltage VREFSEL_L of the RX_LL receiver is fixed to a nominal reference voltage VREFSEL. The RX_LH receiver can be used to find the per bit coefficient for the first dominant tap and, as such, is used for training. Initially threshold voltage VREFSEL_H of the RX_LH receiver can be set to the value of register/parameter VREFSEL_WN_00 of the Nth tap (where N represents the number of the first dominant tap), as determined during step 1 (e.g., by the DFE tap coefficient logic 500 of FIG. 5). For instance, if the second tap is the first dominant tap, then the threshold voltage VREFSEL_H can be set to VREFSEL_W2_00. The control code (parameter RX_TAP_LL<6:0>) for the capacitor DAC operatively coupled to the RX_LL receiver can be set to d'64, while the control code (parameter RX_TAP_LH<6:0>) for the capacitor DAC operatively coupled to the RX_LH receiver can be initially set to d'64. Parameter PAT<1:0> can be set to b'00 to find an average level for a first data pattern associated with b'00. An incoming reference bit stream from the RX_LL receiver can be scanned by the RX_LH receiver, and a decision to increase or decrease parameter RX_TAP_LH<6:0> can be rendered, where parameter RX_TAP_LH<6:0> controls the threshold voltage provided by the capacitor DAC to the RX_LH receiver. For instance, if the parameter PAT<1:0> is set to b'00 and C_ERR is equal to 1, an UP count tracked by an accumulator can be increased, and if the parameter PAT<1:0> is set to b'00 and C_ERR is equal to 0, a DN (down) count tracked by the accumulator can be increased. In this way, the value of parameter RX_TAP_LH<6:0> can eventually converge to an average level of b'00 for the first dominant tap, and this value for parameter RX_TAP_LH<6:0> can be stored in a first register for the first dominant tap (e.g., register CAP_X_00 associated with the first dominant tap) as the per bit coefficient for the first dominant tap based on the first data pattern.

For the remainder of step 2, the average levels for a second data pattern, a third data pattern, and a fourth data pattern are found. For instance, at step 2B, to find an average level for a second data pattern associated with b'01, the forgoing steps (for the first data pattern associated with b'00) can be repeated for the first dominant tap but while the PAT<1:0> is set to b'01, and while the threshold voltage VREFSEL_H of the RX_LH receiver can be set to the value of register/parameter VREFSEL_WN_01 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a second register for the first dominant tap (e.g., register CAP_X_01 associated with the first dominant tap) as the coefficient for the first dominant tap based on the second data pattern.

At step 2C, to find an average level for a third data pattern associated with b'10, the forgoing steps (for the first data pattern associated with b'00) can be repeated for the first dominant tap when the PAT<1:0> is set to b'10, and while the threshold voltage VREFSEL_H of the RX_LH receiver can be set to the value of register/parameter VREFSEL_WN_10 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a third register for the first dominant tap (e.g., register CAP_X_10 associated with the first dominant tap) as the coefficient for the first dominant tap based on the third data pattern.

At step 2D, to find an average level for a fourth data pattern associated with b'11, the forgoing steps (for the first data pattern associated with b'00) can be repeated for the first dominant tap when the PAT<1:0> is set to b'11, and while the threshold voltage VREFSEL_H of the RX_LH receiver can be set to the value of register/parameter VREFSEL_WN_11 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a fourth register for the first dominant tap (e.g., register CAP_X_11 associated with the first dominant tap) as the coefficient for the first dominant tap based on the fourth data pattern.

Eventually, based on the four registers for the first dominant tap (e.g., CAP_X_00, CAP_X_01, CAP_X_10, CAP_X_11), a coefficient for applying the first dominant tap can be computed for each of the four comparators RX_LL, RX_LH, RX_HL, RX_HH, as illustrated in Table 5. In particular, the coefficient of the first dominant tap can be applied by the respective capacitor DAC of each of the respective comparator using their respective control parameter (e.g., RX_TAP_LL<6:0>, RX_TAP_LW6:0>, RX_TAP_HL<6:0>, RX_TAP_HH<6:0>).

The following Table 5 illustrates example parameters, registers, and computation formulas used to find the per bit coefficient for the first dominant tap.

TABLE 5

| Step | Initial value of VREFSEL_H | PAT<1:0> | Registers Storing Results Obtained | Computation to Find Per Bit Coefficient for First Dominant Tap |
|---|---|---|---|---|
| Step 2A | VREFSEL_WN_00 | 2'b 00 | CAP_X_00 | RX_TAP_LL = 0.5*(CAP_X_00 + CAP_X_01) |
| Step 2B | VREFSEL_WN_01 | 2'b 01 | CAP_X_01 | RX_TAP_LH = 0.5*(CAP_X_10 + CAP_X_11) |
| Step 2C | VREFSEL_WN_10 | 2'b 10 | CAP_X_10 | |
| Step 2D | VREFSEL_WN_11 | 2'b 11 | CAP_X_11 | RX_TAP_HL = d'64 RX_TAP_HH = d'64 |

Referring now to FIG. 7, the DFE tap coefficient logic as shown is used to find (e.g., identify) a coefficient for a second dominant tap of a multi-tap DFE (e.g., implemented by the multi-tap DFE logic 150 of FIG. 1). For instance, the DFE tap coefficient logic 700 can be used to find the coefficient for the second dominant tap found (e.g., identified by parameter TAPY_SEL <1:0>) by the DFE tap coefficient logic 500 of FIG. 5.

A receiver RX_LL can comprise the first comparator RX_LL of FIG. 3, and a receiver RX_LH can comprise the second comparator RX_LH of FIG. 3. To find a coefficient for a second dominant tap of the multi-tap DFE using a first data pattern (hereafter, referred to as step 3A), the following operation can be performed while the parameter TAPY_SEL<1:0> set to the second dominant tap (e.g., set by the DFE tap coefficient logic 500 of FIG. 5). The RX_LL receiver can be used to generate reference bit stream, where the threshold voltage VREFSEL_L of the RX_LL receiver is fixed to a nominal reference voltage VREFSEL. The RX_LH receiver can be used to find the coefficient for the second dominant tap and, as such, is used for training. Initially threshold voltage VREFSEL_H of the RX_LH receiver can be set to the value of register/parameter VREFSEL_WN_00 of the Nth tap (where N represents the number of the first dominant tap), as determined during step 1 (e.g., by the DFE tap coefficient logic 500 of FIG. 5). For instance, if the second tap is the first dominant tap, then the threshold voltage VREFSEL_H can bet set to VREFSEL_W2_00. The control code (parameter RX_TAP_LL<6:0>) for the capacitor DAC operatively coupled to the RX_LL receiver can be set to d'64, while the control code (parameter RX_TAP_LH<6:0>) for the capacitor DAC operatively coupled to the RX_LH receiver can be initially set to d'64. Parameter PAT<2:0> can be set to b'000 to find an average level for a first data pattern associated with b'000. An incoming reference bit stream can be scanned by the RX_LL receiver, and a decision to increase or decrease parameter RX_TAP_LH<6:0> can be rendered, where parameter RX_TAP_LH<6:0> controls the threshold voltage provided by the capacitor DAC to the RX_LH receiver. For instance, if the parameter PAT<2:0> is set to b'000 and C_ERR is equal to 1, an UP count tracked by an accumulator can be increased, and if the parameter PAT<2:0> is set to b'000 and C_ERR is equal to 0, a DN (down) count tracked by the accumulator can be increased. In this way, the value of parameter RX_TAP_LH<6:0> can eventually converge to an average level of b'000 for the second dominant tap, and this value for parameter RX_TAP_LH<6:0> can be stored in a first register for the second dominant tap (e.g., register CAP_X_000 associated with the second dominant tap) as the coefficient for the second dominant tap based on the first data pattern.

For the remainder of step 3, the average levels for a second data pattern, a third data pattern, a fourth data pattern, a fifth data pattern, a sixth data pattern, a seventh data pattern, and an eighth data pattern are found. For instance, at step 3B, to find an average level for a second data pattern associated with b'100, the forgoing steps (for the first data pattern associated with b'000) can be repeated for the second dominant tap but while the PAT<2:0> is set to b'100, and while the threshold voltage VREFSEL_H of the RX_LH receiver can be set to the value of register/parameter VREFSEL_WN_00 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a second register for the second dominant tap (e.g., register CAP_Y_100 associated with the second dominant tap) as the coefficient for the second dominant tap based on the second data pattern.

At step 3C, to find an average level for a third data pattern associated with b'001, the forgoing steps (for the first data pattern associated with b'000) can be repeated for the second dominant tap but while the PAT<2:0> is set to b'001, and while the threshold voltage VREFSEL_H of the RX_LH receiver can be set to the value of register/parameter VREFSEL_WN_01 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a third register for the second dominant tap (e.g., register CAP_Y_001 associated with the second dominant tap) as the coefficient for the second dominant tap based on the third data pattern.

At step 3D, to find an average level for a fourth data pattern associated with b'101, the forgoing steps (for the first data pattern associated with b'000) can be repeated for the second dominant tap but while the PAT<2:0> is set to b'101, and while the threshold voltage VREFSEL_H of the RX_LH receiver can be set to the value of register/parameter VREFSEL_WN_01 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a fourth register for the second dominant tap (e.g., register CAP_Y_101 associated with the second dominant tap) as the coefficient for the second dominant tap based on the fourth data pattern.

At step 3E, to find an average level for a fifth data pattern associated with b'010, the forgoing steps (for the first data pattern associated with b'000) can be repeated for the second dominant tap but while the PAT<2:0> is set to b'010, and while the threshold voltage VREFSEL_H of the RX_LH receiver can be set to the value of register/parameter VREFSEL_WN_10 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a fifth register for the second dominant tap (e.g., register CAP_Y_010 associated with the second dominant tap) as the coefficient for the second dominant tap based on the fifth data pattern.

At step 3F, to find an average level for a sixth data pattern associated with b'110, the forgoing steps (for the first data pattern associated with b'000) can be repeated for the second dominant tap but while the PAT<2:0> is set to b'110, and while the threshold voltage VREFSEL_H of the RX_LH receiver can be set to the value of register/parameter VREFSEL_WN_10 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a sixth register for the second dominant tap (e.g., register CAP_Y_110 associated with the second dominant tap) as the coefficient for the second dominant tap based on the sixth data pattern.

At step 3G, to find an average level for a seventh data pattern associated with b'011, the forgoing steps (for the first data pattern associated with b'000) can be repeated for the second dominant tap but while the PAT<2:0> is set to b'011, and while the threshold voltage VREFSEL_H of the RX_LH receiver can be set to the value of register/parameter VREFSEL_WN_11 of the Nth tap (where N represents the number of the first dominant tap), as determined during step 1 (e.g., by the DFE tap coefficient logic 500 of FIG. 5). The resulting value for parameter RX_TAP_LH<6:0> can be stored in a seventh register for the second dominant tap (e.g., register CAP_Y_011 associated with the second dominant tap) as the coefficient for the second dominant tap based on the seventh data pattern.

At step 3H, to find an average level for an eighth data pattern associated with b'111, the forgoing steps (for the first data pattern associated with b'000) can be repeated for the second dominant tap but while the PAT<2:0> is set to b'11, and while the threshold voltage VREFSEL_H of the RX_LH receiver can be set to the value of register/parameter VREFSEL_WN_11 of the Nth tap (where N represents the number of the first dominant tap), as determined during step 1 (e.g., by the DFE tap coefficient logic 500 of FIG. 5). The resulting value for parameter RX_TAP_LH<6:0> can be stored in an eighth register for the second dominant tap (e.g., register CAP_Y_111 associated with the second dominant tap) as the coefficient for the second dominant tap based on the eighth data pattern.

Eventually, based on the eight registers for the second dominant tap (e.g., CAP_Y_000, CAP_Y_100, CAP_Y_001, CAP_Y_101, CAP_Y_010, CAP_Y_110, CAP_Y_011, CAP_Y_111), a coefficient for applying the first dominant tap and a coefficient for applying the second dominant tap can be computed for each of the four comparators RX_LL, RX_LH, RX_HL, RX_HH, as illustrated in Table 6. In particular, the combined coefficients of the first and the second dominant taps can be applied by the respective capacitor DAC of each of the respective comparator using their respective control parameter (e.g., RX_TAP_LL<6:0>, RX_TAP_LH<6:0>, RX_TAP_HL<6:0>, RX_TAP_HH<6:0>).

The following Table 6 illustrates example parameters, registers, and computation formulas used to find the coefficient for the second dominant tap.

TABLE 6

| Step | Initial value of VREFSEL_H | PAT<2:0> | Registers Storing Results Obtained | Computation to Find Second Dominant Tap |
| --- | --- | --- | --- | --- |
| Step 3A | VREFSEL_WN_00 | 3'b 000 | CAP_Y_000 | RX_TAP_LL<6:0> = |
| Step 3B |  | 3'b 100 | CAP_Y_100 | 0.5*(CAP_Y_000 + |
| Step 3C | VREFSEL_WN_01 | 3'b 001 | CAP_Y_001 | CAP_Y_001) |
| Step 3D |  | 3'b 101 | CAP_Y_101 | RX_TAP_LH<6:0> = |
| Step 3E | VREFSEL_WN_10 | 3'b 010 | CAP_Y_010 | 0.5*(CAP_Y_010 + |
| Step 3F |  | 3'b 110 | CAP_Y_110 | CAP_Y_011) |
| Step 3G | VREFSEL_WN_11 | 3'b 011 | CAP_Y_011 | RX_TAP_HL<6:0> = |
| Step 3H |  | 3'b 111 | CAP_Y_111 | 0.5*(CAP_Y_100 + CAP_Y_101) RX_TAP_HH<6:0> = 0.5*(CAP_Y_110 + CAP_Y_111) |

Referring again to FIG. 4, after a first dominant tap, a second dominant tap, a per bit coefficient for the first dominant tap, and a coefficient for the second dominant tap are found, the multi-tap DFE logic 400 can be configured to apply the found (e.g., identified or trained) coefficients for the plurality of comparators 300 of FIG. 3. For instance, in response to if RX_DFE_EN<1:0> equaling b'01 or b'10, parameter VREFSEL_L<8:0> can be set to VREFSEL_LN from step 1, and parameter VREFSEL_H<8:0> can be set to VREFSEL_HN from step 1. Where RX_DFE_EN<1:0> equals b'00 and DFE is disabled, parameter VREFSEL_L<8:0>, parameter VREFSEL_H<8:0>, and parameter=VREFSEL<8:0> are set equal to each other. In response to parameter RX_DFE_EN<1:0> indicating that one floating tap is to be enabled (e.g., RX_DFE_EN<1:0> equals b'01), values for parameters RX_TAP_LL<6:0>, RX_TAP_LH<6:0>, RX_TAP_HL<6:0>, RX_TAP_HH<6:0>, as found (e.g., identified or trained) by step 2, are applied to control the capacitor DACs of the comparators RX_LL, RX_LH, RX_HL, RX_HH. In response to parameter RX_D-FE_EN<1:0> indicating that two floating taps are to be enabled (e.g., RX_DFE_EN<1:0> equals b'10), values for parameters RX_TAP_LL<6:0>, RX_TAP_LH<6:0>, RX_TAP_HL<6:0>, RX_TAP_HH<6:0>, as found (e.g., identified or trained) by step 3, are applied to control the capacitor DACs of the comparators RX_LL, RX_LH, RX_HL, RX_HH. In response to parameter RX_D-FE_EN<1:0> indicating that DFE is disabled, all parameters RX_TAP_LL<6:0>, RX_TAP_LH<6:0>, RX_TAP_HL<6:0>, RX_TAP_HH<6:0> are set to d'64. Eventually, in the context of a memory system, strobe position for all bits can be retrained using a predetermined data pattern, such as a pattern comprising PRBS7 or higher.

The following Table 7 illustrates example parameters and outputs of the control logic 414 and the control logic 424 during operation of the multi-tap DFE logic 400.

TABLE 7

| Value of "X" and "Y" are obtained from step 1 | | | | | |
| --- | --- | --- | --- | --- | --- |
| RX_DFE_EN<1> | RX_DFE_EN<0> | TapXE | TapYE | TapXO | TapYO |
| 0 | 0 | VSS | VSS | VSS | VSS |
| 0 | 1 | TapXE | VSS | TapXO | VSS |
| 1 | 0 | TapXE | Tap YE | TapXO | TapYO |

Figure 8:
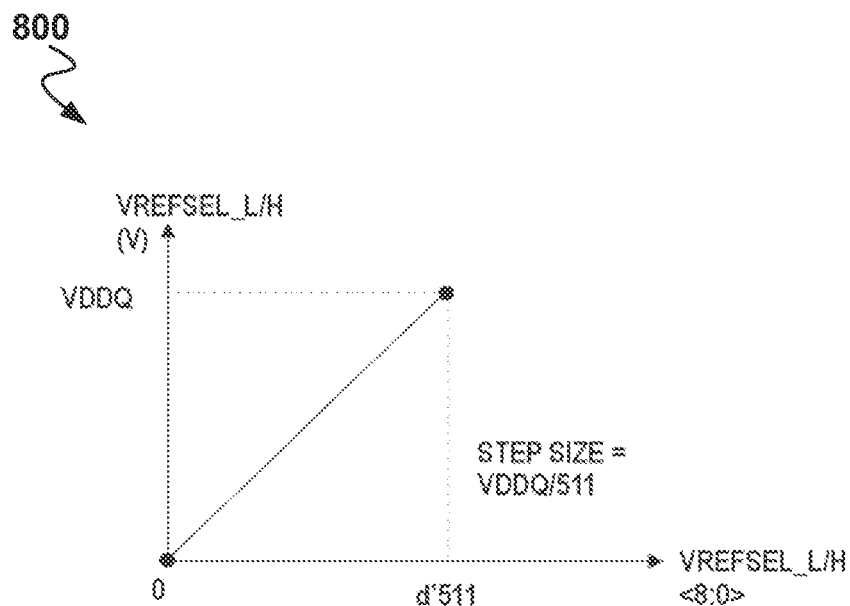
FIG. 8 provides graphs that illustrate example transfer characteristics, in accordance with various embodiments.
Figure 8:
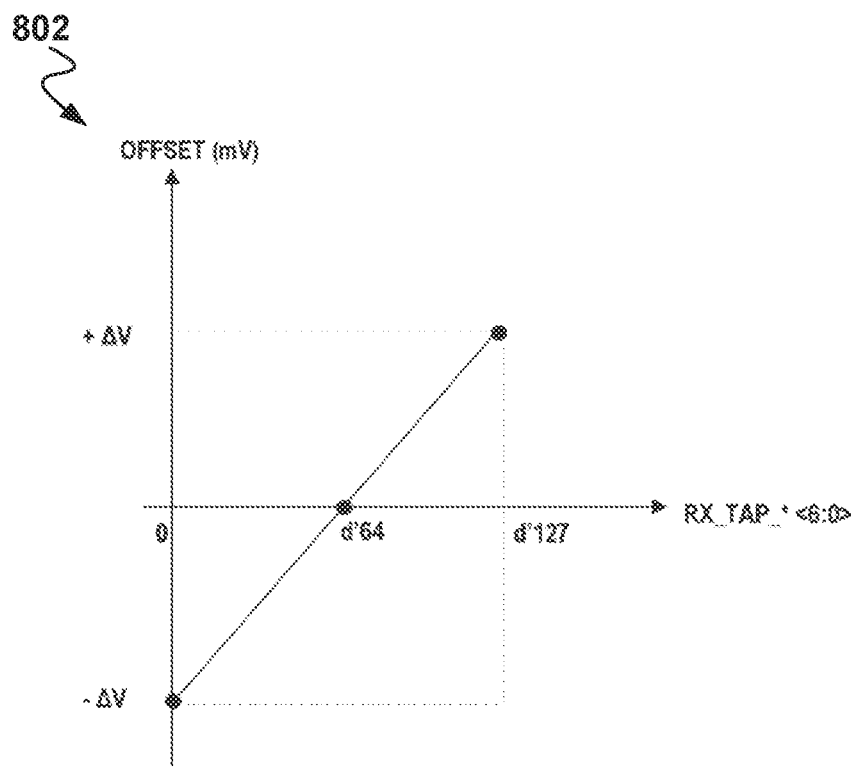

FIG. 8 provide graphs 800, 802 that illustrate example transfer characteristics, in accordance with various embodiments. In particular, graph 800 illustrates a transfer characteristic of a reference voltage as generated by a resistor DAC of the plurality of resistor DACs 200 of FIG. 2. As shown, the step size is controlled by a parameter of VREFSEL_L/H<8:0>. Graph 802 illustrates a transfer characteristic of a threshold voltage as generated by a capacitor DAC of the plurality of comparators 300 of FIG. 3. As shown, the voltage offset is controlled by parameter of RX_TAP_*<6:0>.

Figure 9:
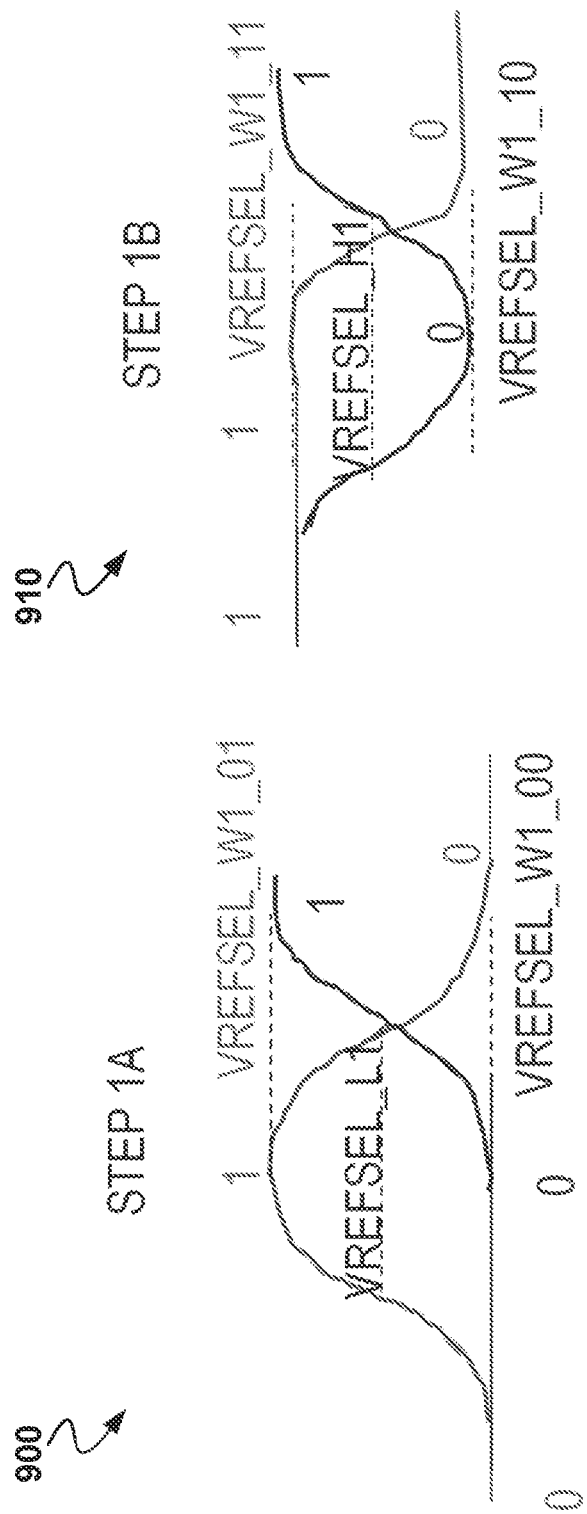
FIGS. 9 through 12 are graphs that visually illustrate parameter values determined during steps performed by various embodiments.
Figure 10:
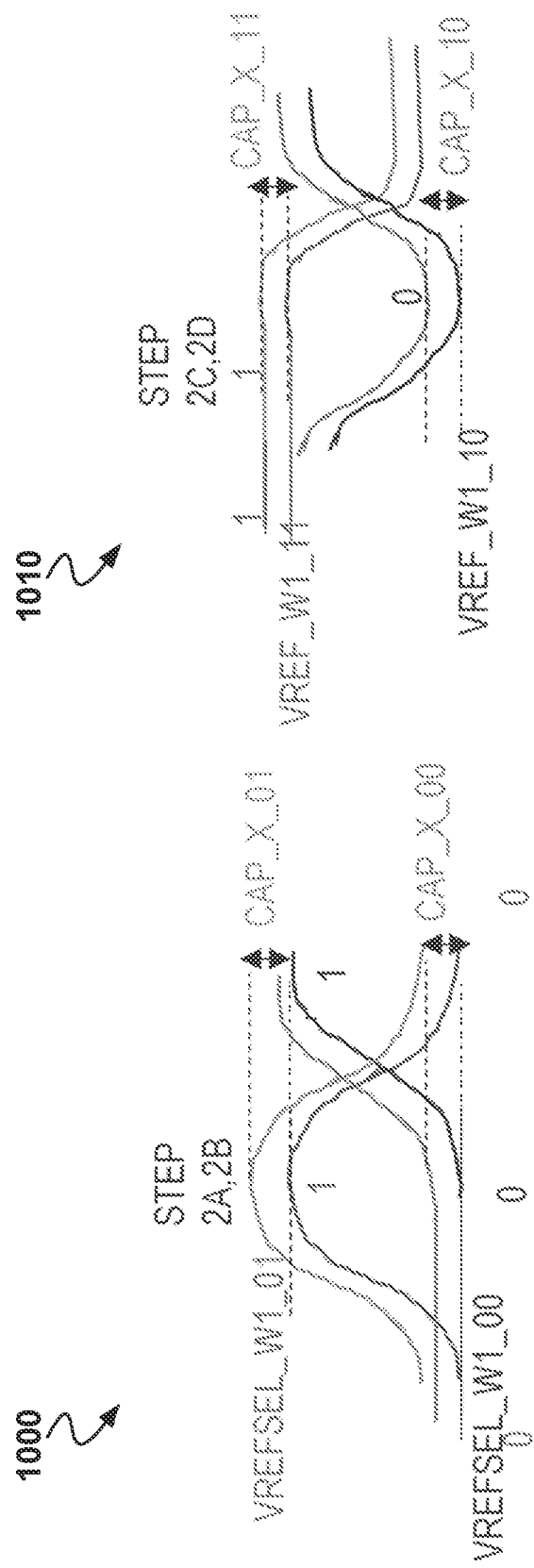
Figure 11:
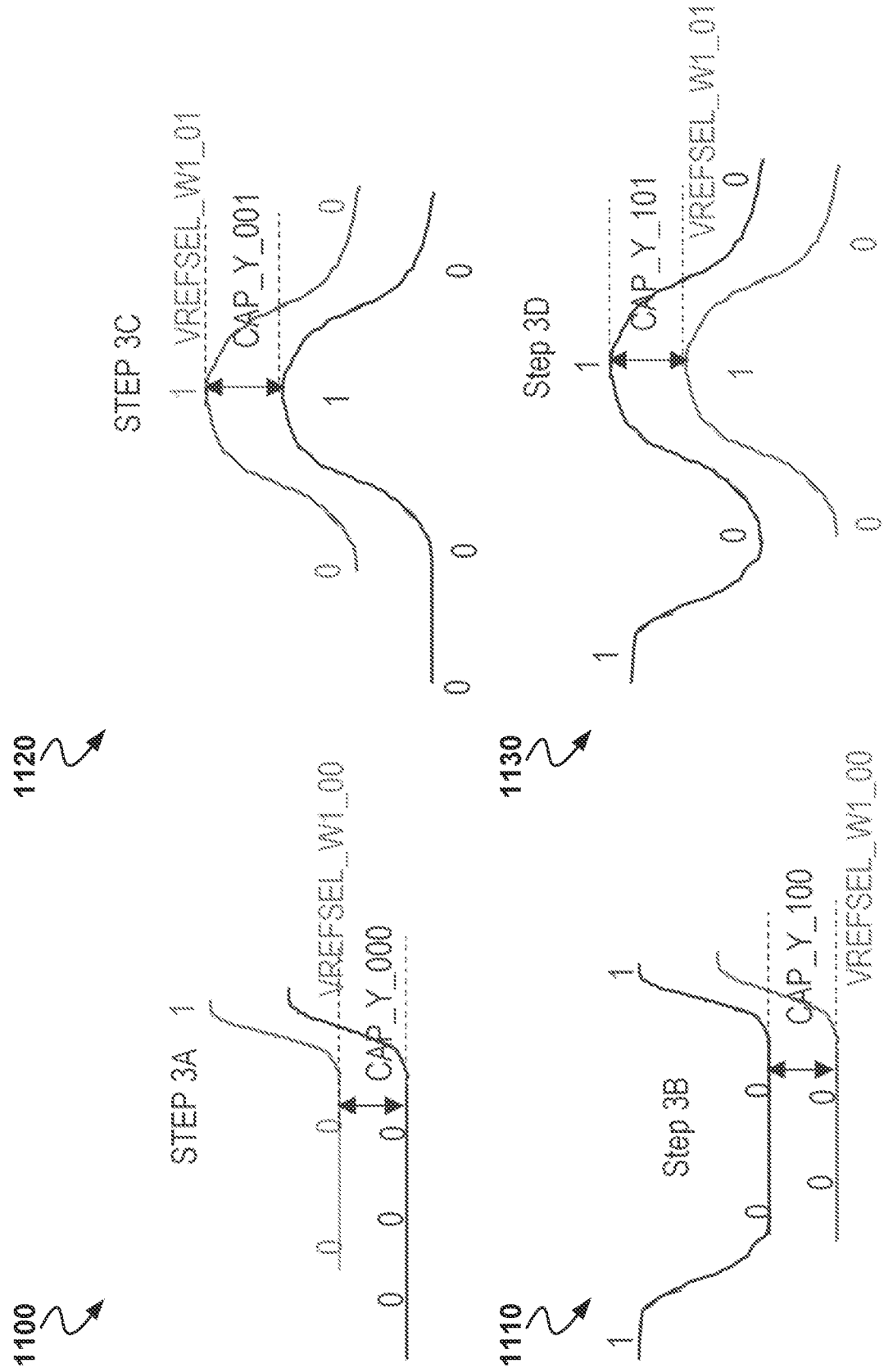
Figure 12:
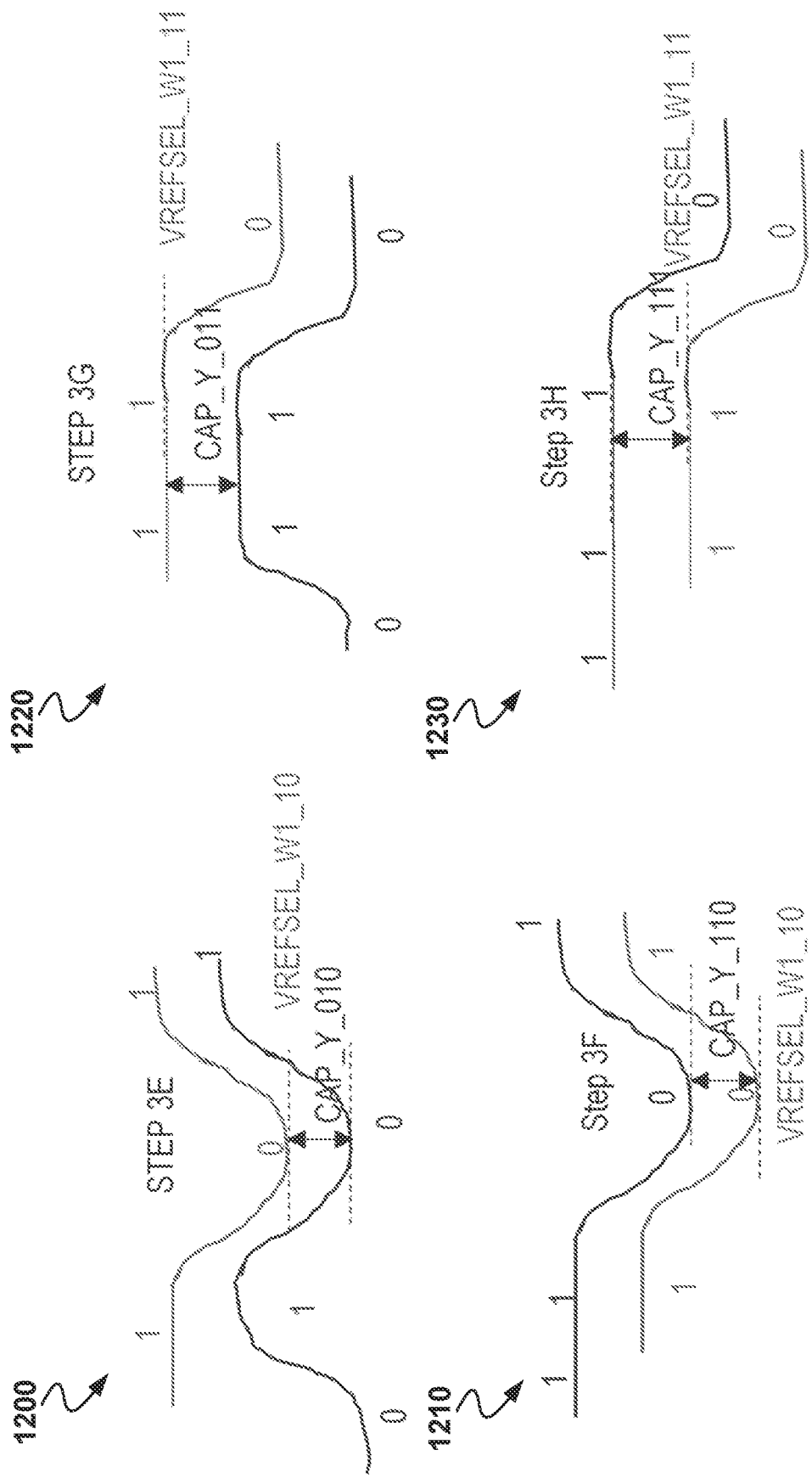

FIGS. 9 through 12 are graphs that visually illustrate parameter values determined during steps performed by various embodiments for a case where the first and second dominant taps are tap1 and tap2 respectively. Referring now to FIG. 9, graph 900 illustrates parameters VREFSEL_W1_00, VREFSEL_W1_01, and VREFSEL_L1 as determined during step 1A. Graph 910 illustrates parameters VREFSEL_W1_10, VREFSEL_W1_11, and VREFSEL_H1 as determined during step 1B. Referring now to FIG. 10, graph 1000 illustrates parameters CAP_X_00 and CAP_X_01 as determined during steps 2A and 2B based on parameters VREFSEL_W1_00 and VREFSEL_W1_01. Graph 1010 illustrates parameters CAP_X_10 and CAP_X_11 as determined during steps 2C and 2D based on parameters VREFSEL_W1_10 and VREFSEL_W1_11. Referring now to FIG. 11, graph 1100 illustrates parameters CAP_Y_000 as determined during step 3A based on parameter VREFSEL_W1_00, graph 1110 illustrates parameters CAP_Y_100 as determined during step 3B based on parameter VREFSEL_W1_00, graph 1120 illustrates parameters CAP_Y_001 as determined during step 3C based on parameter VREFSEL_W1_01, and graph 1130 illustrates parameters CAP_Y_101 as determined during step 3D based on parameter VREFSEL_W1_01. Referring now to FIG. 12, graph 1200 illustrates parameters CAP_Y_010 as determined during step 3E based on parameter VREFSEL_W1_10, graph 1210 illustrates parameters CAP_Y_110 as determined during step 3F based on parameter VREFSEL_W1_10, graph 1220 illustrates parameters CAP_Y_011 as determined during step 3G based on parameter VREFSEL_W1_11, and graph 1230 illustrates parameters CAP_Y_111 as determined during step 3H based on parameter VREFSEL_W1_11.

Figure 13:
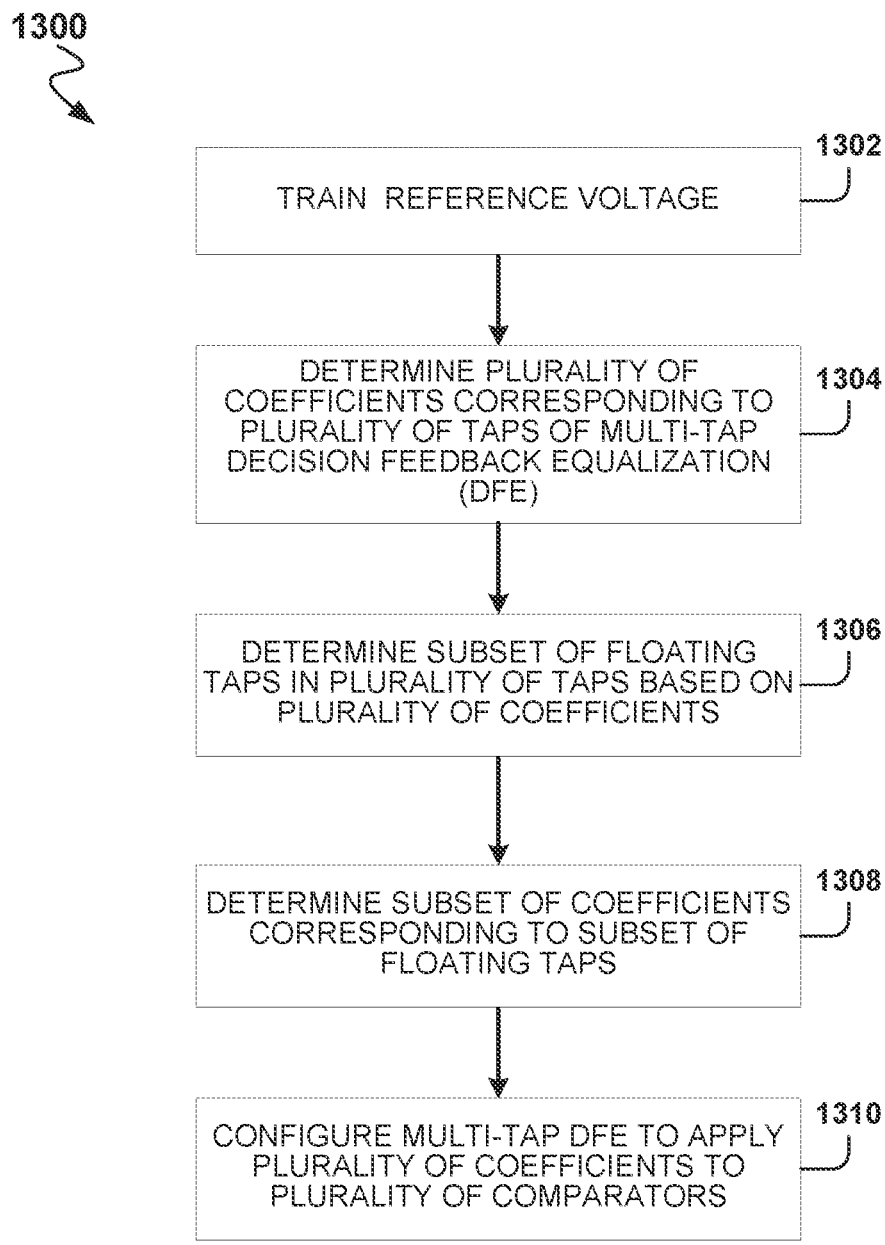
FIG. 13 is a flowchart illustrating an example method for identifying and training a floating tap for DFE, in accordance with various embodiments.

FIG. 13 is a flowchart illustrating an example method 1300 for identifying and training a floating tap for DFE, in accordance with various embodiments. Some or all of the method 1300 can be performed by a circuit, such as one or more of the circuits/components described herein with respect to FIGS. 1 through 7. For instance, the DFE tap coefficient logic 600 of FIG. 6 can perform at least some of the operations of the method 1300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Further, for some embodiments, a method described herein may have more or fewer operations than otherwise depicted.

At operation 1302, a reference voltage used by a multi-tap DFE is trained. For instance, the reference voltage generated by one or more of a plurality of resistor DACs (e.g., 120) can be trained (e.g., calibrated). During operation 1304, a plurality of coefficients, corresponding to a plurality of taps of a multi-tap DFE, is determined. For instance, a coefficient is determined for each tap of the plurality of taps sequentially, and the plurality of taps are sorted based on a magnitude (e.g., absolute value) of corresponding coefficients in the plurality of coefficients. For some embodiments, a plurality of resistor DACs (e.g., 200) generates adjusted reference voltages for determining (e.g., identifying or training) individual coefficients of the plurality of coefficients.

Based on the plurality of coefficients determined by operation 1304, a subset of floating taps in the plurality of taps is determined at operation 1306. For instance, a first dominant tap in the plurality of taps is determined based on the plurality of coefficients (e.g., first dominant tap corresponds to a coefficient with the largest magnitude in the plurality of coefficients), and a second dominant tap in the plurality of taps is determined based on the plurality of coefficients (e.g., second dominant tap corresponds to a coefficient with the second largest magnitude in the plurality of coefficients).

For the subset of floating taps, at operation 1308, a subset of coefficients of the plurality of coefficients that corresponds to the subset of floating taps is determined. For some embodiments, a plurality of resistor DACs (e.g., 200) is used to implement a per bit coefficient with respect to the first dominant tap, and a plurality of capacitor DACs (e.g., as shown in FIG. 3) is used to implement a coefficient with respect to the second dominant tap.

Eventually, at operation 1310, the multi-tap DFE is configured to apply the plurality of coefficients to a plurality of comparators (e.g., 300). For various embodiments, the plurality of comparators is configured to receive a data signal and compare the data signal against a different threshold voltage (generated by respective capacitive DACs).

Figure 14:
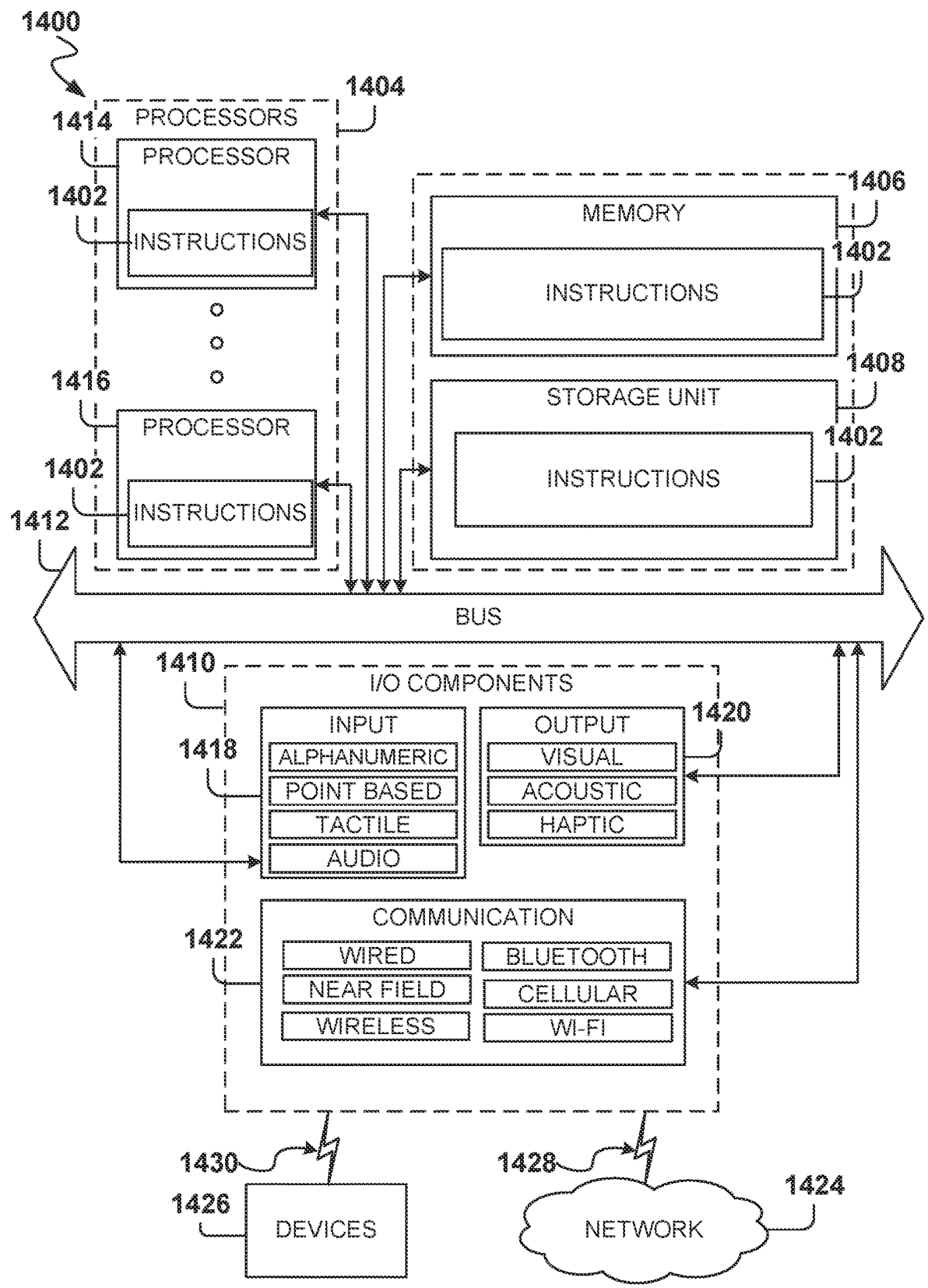
FIG. 14 is a block diagram illustrating components of a machine, according to some example embodiments, able to read instructions from a machine-readable medium and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a system within which instructions 1402 (e.g., software, a program, an application, an applet, an app, a driver, or other executable code) for causing the machine 1400 to perform any one or more of the methodologies discussed herein may be executed. For example, the instructions 1402 include executable code that causes the machine 1400 to execute a method that implements, in a circuit design, a multi-tap DFE with one or more floating taps in accordance with various embodiments. In this way, these instructions 1402 transform the general, non-programmed machine 1400 into a particular machine programmed to carry out a method in a manner described herein. The machine 1400 may operate as a standalone device or may be coupled (e.g., networked) to other machines.

By way of non-limiting example, the machine 1400 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 1402, sequentially or otherwise, that specify actions to be taken by the machine 1400. Further, while only a single machine 1400 is illustrated, the term "machine" shall also be taken to include a collection of machines 1400 that individually or jointly execute the instructions 1402 to perform any one or more of the methodologies discussed herein.

The machine 1400 may include processors 1404, memory 1406, a storage unit 1408, and I/O components 1410, which may be configured to communicate with each other such as via a bus 1412. In an example embodiment, the processors 1404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1414 and a processor 1416 that may execute the instructions 1402. The term "processor" is intended to include multi-core processors 1404 that may comprise two or more independent processors (sometimes referred to as "cores") that may execute instructions 1402 contemporaneously. Although FIG. 14 shows multiple processors 1404, the machine 1400 may include a single processor with a single core, a single processor with multiple cores (e.g., a multi-core processor), multiple processors with a single core, multiple processors with multiple cores, or any combination thereof.

The memory 1406 (e.g., a main memory or other memory storage) and the storage unit 1408 are both accessible to the processors 1404 such as via the bus 1412. The memory 1406 and the storage unit 1408 store the instructions 1402 embodying any one or more of the methodologies or functions described herein. The instructions 1402 may also reside, completely or partially, within the memory 1406, within the storage unit 1408, within at least one of the processors 1404 (e.g., within the processor's cache memory), or any suitable combination thereof, during execution thereof by the machine 1400. Accordingly, the memory 1406, the storage unit 1408, and the memory of the processors 1404 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1402. The term "machine-readable medium" shall also be taken to include any medium, or combination of multiple media, that is capable of storing instructions (e.g., instructions 1402) for execution by a machine (e.g., machine 1400), such that the instructions, when executed by one or more processors of the machine (e.g., processors 1404), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1410 may include a wide variety of components to receive input, provide output, produce output, transmit information, exchange information, capture measurements, and so on. The specific I/O components 1410 that are included in a particular machine 1400 will depend on the type of the machine 1400. For example, portable machines such as mobile phones will likely include a touch input device or other such input mechanisms, while a headless server machine will likely not include such a touch input device. It will be appreciated that the I/O components 1410 may include many other components that are not specifically shown in FIG. 14. The I/O components 1410 are grouped according to functionality merely for simplifying the following discussion and the grouping is in no way limiting. In various example embodiments, the I/O components 1410 may include input components 1418 and output components 1420. The input components 1418 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 1420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1410 may include communication components 1422 operable to couple the machine 1400 to a network 1424 or devices 1426 via a coupling 1428 and a coupling 1430 respectively. For example, the communication components 1422 may include a network interface component or another suitable device to interface with the network 1424. In further examples, the communication components 1422 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1426 may be another machine or any of a wide variety of peripheral devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Embodiments may be implemented in digital electronic circuitry, in computer hardware, firmware, or software, or in combinations of them. Embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 15:
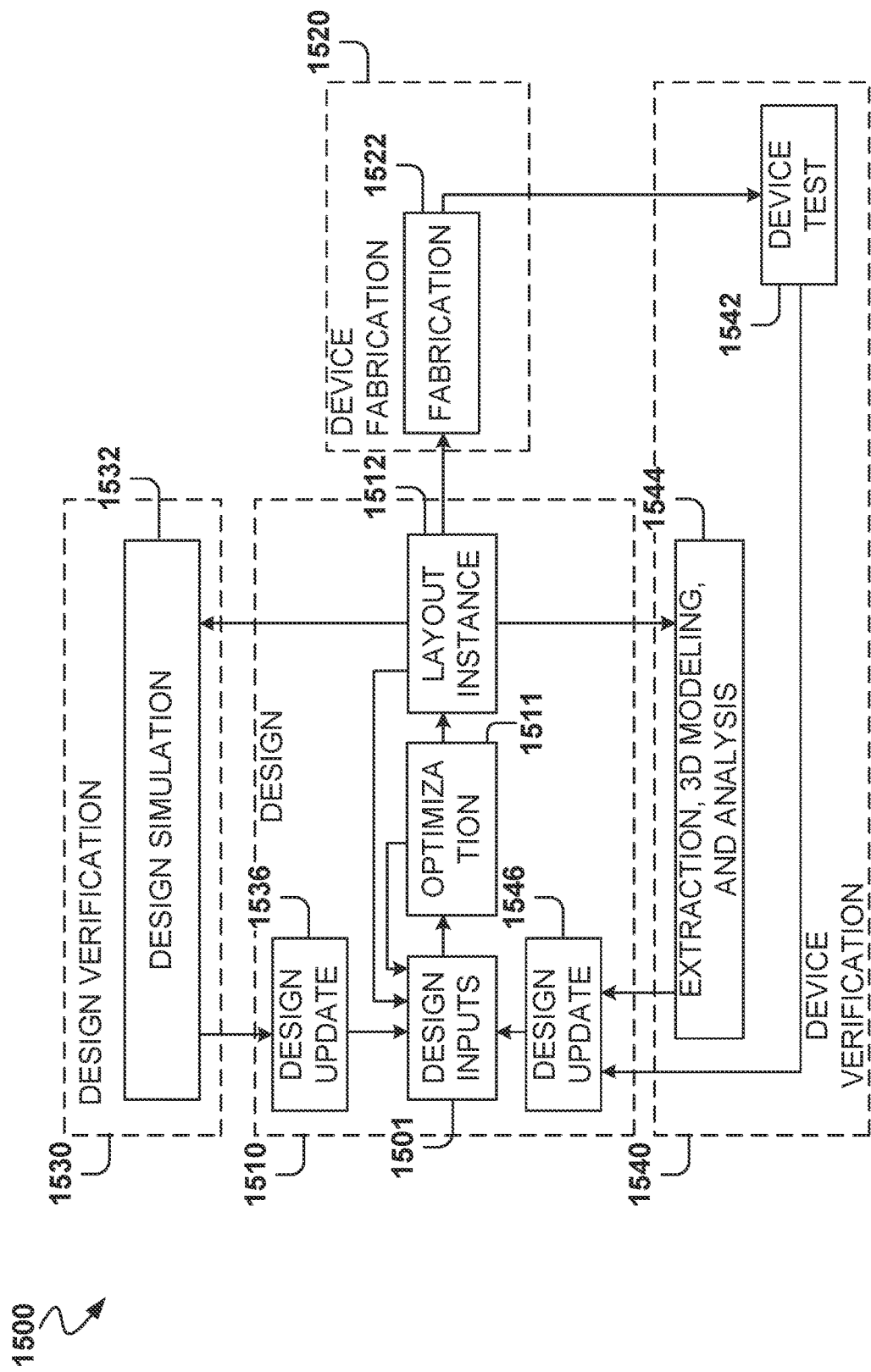
FIG. 15 is a diagram illustrating one possible design process flow for generating a circuit, including embodiments to implement a multi-tap DFE with one or more floating taps as described herein, and in various embodiments, to integrate the circuit with a larger circuit.

FIG. 15 is a diagram illustrating one possible design process flow for generating a circuit, including embodiments to implement a multi-tap DFE with one or more floating taps as described herein, and in various embodiments, to integrate the circuit with a larger circuit. As illustrated, the overall design flow 1500 includes a design phase 1510, a device fabrication phase 1520, a design verification phase 1530, and a device verification phase 1540. The design phase 1510 involves an initial design input operation 1501 where the basic elements and functionality of a device are determined, as well as revisions based on various analyses and optimization of a circuit design. This design input operation 1501 is where instances of an EDA circuit design file are used in the design and any additional circuitry is selected. The initial strategy, tactics, and context for the device to be created are also generated in the design input operation 1501, depending on the particular design algorithm to be used.

In some embodiments, following an initial selection of design values in the design input operation 1501, timing analysis and optimization according to various embodiments occurs in an optimization operation 1511, along with any other automated design processes. One such process may be the automated design of a partitioned root search for error locator polynomial functions in RS FEC decoding. As described below, design constraints for blocks of a circuit design generated with design inputs in the design input operation 1501 may be analyzed using hierarchical timing analysis, according to various embodiments. While the design flow 1500 shows such optimization occurring prior to a layout instance 1512, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 1522.

After design inputs are used in the design input operation 1501 to generate a circuit layout, and any optimization operations 1511 are performed, a layout is generated in the layout instance 1512. The layout describes the physical layout dimensions of the device that match the design inputs. This layout may then be used in the device fabrication operation 1522 to generate a device, or additional testing and design updates may be performed using designer inputs or automated updates based on design simulation 1532 operations or extraction, 3D modeling, and analysis 1544 operations. Once the device is generated, the device can be tested as part of device test 1542 operations, and layout modifications generated based on actual device performance.

As described in more detail below, design updates 1536 from the design simulation 1532, design updates 1546 from the device test 1542, the extraction, 3D modeling, and analysis 1544 operations, or the design input operation 1501 may occur after an initial layout instance 1512 is generated. In various embodiments, whenever design inputs are used to update or change an aspect of a circuit design, a timing analysis and optimization operation 1511 may be performed.

For example, in various embodiments, a user may provide an input to a computing device indicating placement of elements of a circuit within a portion of a circuit design, including description of circuitry for a multi-channel memory interface described herein. An output to a display of the computing device may show details of a circuit design, and may further be used to generate results of the timing analysis or show recommended optimizations or automatically performed adjustments to the circuit design based on the timing analysis. Further inputs to the computing device may involve adjustments as user design inputs, with additional timing analysis and optimization initiated via user operation of the computing device. In some embodiments, a computing device may be used to generate circuit design files describing circuitry corresponding to embodiments described herein. Such circuit design files may be used as outputs to generate photolithographic masks or other control files and components used to generate circuits that operate in accordance with various embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   determining, by a tap coefficient logic, a plurality of coefficients corresponding to a plurality of taps of a multi-tap decision feedback equalization;
   determining, by the tap coefficient logic, a subset of floating taps in the plurality of taps based on the plurality of coefficients;
   determining, by the tap coefficient logic, a subset of coefficients in the plurality of coefficients that corresponds to the subset of floating taps; and
   configuring, by the tap coefficient logic, the multi-tap decision feedback equalization to apply the plurality of coefficients to a plurality of comparators, the plurality of comparators being configured to receive a data signal.

2. The method of claim 1, wherein the determining of the plurality of coefficients comprises:
   determining a coefficient for each tap of the plurality of taps sequentially; and
   sorting the plurality of taps based on a magnitude of corresponding coefficients in the plurality of coefficients.

3. The method of claim 1, wherein the determining of the subset of floating taps comprises:
   determining, based on the plurality of coefficients, a dominant tap in the plurality of A taps, the subset of floating taps comprising the dominant tap.

4. A circuit comprising:
a plurality of resistor digital-to-analog converters;
a plurality of capacitor digital-to-analog converters operatively coupled to the plurality of resistor digital-to-analog converters;
a plurality of comparators, each comparator of the plurality of comparators comprising:
a first input configured to receive a data signal;
a second input configured to receive a threshold voltage from a corresponding capacitor digital-to-analog converter in the plurality of capacitor digital-to-analog converters;
a comparator output configured to provide an output signal generated based on the data signal and the threshold voltage;
a first logic configured to implement multi-tap decision feedback equalization based on comparator outputs of the plurality of comparators; and
a second logic configured to determine a plurality of coefficients corresponding to a plurality of taps of the multi-tap decision feedback equalization, determine a subset of floating taps in the plurality of taps based on the plurality of coefficients, and redetermine a subset of coefficients in the plurality of coefficients that corresponds to the subset of floating taps.

5. The circuit of claim 4, wherein the second logic is configured to determine the plurality of coefficients by:
determining a coefficient for each tap of the plurality of taps sequentially; and
sorting the plurality of taps based on a magnitude of corresponding coefficients in the plurality of coefficients.

6. The circuit of claim 4, wherein the second logic is configured to determine the plurality of coefficients using the plurality of resistor digital-to-analog converters.

7. The circuit of claim 1, wherein the second logic is configured to determine the subset of floating taps in the plurality of taps based on the plurality of coefficients by:
determining, based on the plurality of coefficients, a first dominant tap in the plurality of taps, the subset of floating taps comprising the first dominant tap.

8. The circuit of claim 7, wherein the second logic is configured to configure the circuit to apply a coefficient of the first dominant tap using one of the plurality of resistor digital-to-analog converters.

9. The circuit of claim 7, wherein the second logic is configured to redetermine the subset of coefficients by:
determining a per bit coefficient for the first dominant tap.

10. The circuit of claim 7, wherein the second logic is configured to determine the subset of floating taps in the plurality of taps based on the plurality of coefficients by:
determining, based on the plurality of coefficients, a second dominant tap in the plurality of taps, the subset of floating taps comprising the second dominant tap.

11. The circuit of claim 10, wherein the second logic is configured to configure the circuit to apply a coefficient of the second dominant tap using one of the plurality of capacitor digital-to-analog converters.

12. The circuit of claim 10, wherein the second logic is configured to redetermine the subset of coefficients by:
determining a per bit coefficient for the first dominant tap; and
redetermining a coefficient for the second dominant tap after the per bit coefficient is determined for the first dominant tap.

13. The circuit of claim 4, wherein each resistor digital-to-analog converter in the plurality of resistor digital-to-analog converters is configured to individually generate an adjusted reference voltage based on a single reference voltage.

14. The circuit of claim 13, wherein the corresponding capacitor digital-to-analog converter is configured to generate the threshold voltage based on one of the adjusted reference voltages generated by the plurality of resistor digital-to-analog converters.

15. The circuit of claim 13, further comprising:
a third logic configured to train the single reference voltage prior the determining of the plurality of coefficients.

16. The circuit of claim 4, wherein the plurality of resistor digital-to-analog converters comprises a first resistor digital-to-analog converter and a second resistor digital-to-analog converter, wherein the plurality of capacitor digital-to-analog converters comprises a first capacitor digital-to-analog converter, a second capacitor digital-to-analog converter, a third capacitor digital-to-analog converter, and a fourth capacitor digital-to-analog converter, and wherein the plurality of comparators comprises a first comparator, a second comparator, a third comparator, and a fourth comparator.

17. The circuit of claim 16, wherein the first resistor digital-to-analog converter is configured to generate a first adjusted reference voltage based on a single reference voltage, wherein the second resistor digital-to-analog converter is configured to generate a second adjusted reference voltage based on the single reference voltage, wherein the first capacitor digital-to-analog converter is configured to generate a first threshold voltage for the first comparator based on the first adjusted reference voltage, wherein the second capacitor digital-to-analog converter is configured to generate a second threshold voltage for the second comparator based on the first adjusted reference voltage, wherein the third capacitor digital-to-analog converter is configured to generate a third threshold voltage for the third comparator based on the second adjusted reference voltage, and wherein the fourth capacitor digital-to-analog converter is configured to generate a fourth threshold voltage for the fourth comparator based on the second adjusted reference voltage.

18. The circuit of claim 4, wherein the second logic is configured to configure the first logic to apply the plurality of coefficients to the plurality of taps.

19. The circuit of claim 4, wherein the circuit forms a part of a channel receiver of a memory system, and wherein the circuit further comprises:
a third logic configured to retrain strobe positions for all bits using a predetermined data pattern.

20. A non-transitory computer-readable medium comprising instructions that, when executed by one or more processors of a computing device, cause the computing device to generate a circuit design by performing operations comprising:
configuring, in the circuit design, a plurality of resistor digital-to-analog converters;
configuring, in the circuit design, a plurality of capacitor digital-to-analog converters operatively coupled to the plurality of resistor digital-to-analog converters;
configuring, in the circuit design, a plurality of comparators, each comparator of the plurality of comparators comprising:
a first input configured to receive a data signal;
a second input configured to receive a threshold voltage from a corresponding capacitor digital-to-analog converter in the plurality of capacitor digital-to-analog converters; and a comparator output configured to provide an output signal generated based on the data signal and the threshold voltage;

configuring, in the circuit design, a first logic to implement multi-tap decision feedback equalization based on comparator outputs of the plurality of comparators; and configuring, in the circuit design, a second logic to determine a plurality of coefficients corresponding to a plurality of taps of the multi-tap decision feedback equalization, determine a subset of floating taps in the plurality of taps, and redetermine a subset of coefficients in the plurality of coefficients that corresponds to the subset of floating taps.

* * * * *